(12) United States Patent
Shin et al.

(10) Patent No.: US 11,409,114 B2
(45) Date of Patent: Aug. 9, 2022

(54) IMAGE DISPLAY DEVICE CAPABLE OF MULTI-DEPTH EXPRESSION

(71) Applicants: SAMSUNG ELECTRONICS CO., LTD., Suwon-si (KR); AJOU UNIVERSITY INDUSTRY-ACADEMIC COOPERATION FOUNDATION, Suwon-si (KR)

(72) Inventors: Bongsu Shin, Seoul (KR); Jesung Koh, Suwon-si (KR); Geeyoung Sung, Daegu (KR); Hongseok Lee, Seoul (KR); Dongjin Kim, Suwon-si (KR); Baekgyeom Kim, Suwon-si (KR)

(73) Assignees: SAMSUNG ELECTRONICS CO., LTD., Suwon-si (KR); AJOU UNIVERSITY INDUSTRY-ACADEMIC COOPERATION FOUNDATION, Suwon-si (KR)

( * ) Notice: Subject to any disclaimer, the term of this patent is extended or adjusted under 35 U.S.C. 154(b) by 0 days.

(21) Appl. No.: 17/170,269

(22) Filed: Feb. 8, 2021

(65) Prior Publication Data
US 2021/0271090 A1 Sep. 2, 2021

(30) Foreign Application Priority Data

Mar. 2, 2020 (KR) .................. 10-2020-0026123
Nov. 30, 2020 (KR) .................. 10-2020-0165075

(51) Int. Cl.
G02B 27/01 (2006.01)
G02B 30/34 (2020.01)
(Continued)

(52) U.S. Cl.
CPC ..... *G02B 27/0176* (2013.01); *G02B 27/0172* (2013.01); *G02B 30/34* (2020.01);
(Continued)

(58) Field of Classification Search
CPC G02B 27/0176; G02B 30/34; G02B 27/0172; G02B 2027/0134;
(Continued)

(56) References Cited

U.S. PATENT DOCUMENTS

2011/0169918 A1 7/2011 Yoo
2015/0279102 A1* 10/2015 Fleck ................. G06T 7/579
345/87

(Continued)

FOREIGN PATENT DOCUMENTS

KR 10-2019-0108727 A 9/2019
KR 10-2020-0086980 A 7/2020

*Primary Examiner* — Xin Sheng
(74) *Attorney, Agent, or Firm* — Sughrue Mion, PLLC

(57) ABSTRACT

Provided is an image display device including a display element configured to modulate light to form an image; a light transfer unit configured to transmit the image formed by the display element to eyes of an observer, the light transfer unit comprising a focusing member; and a driver configured to drive the display element to change a position of the display element, the driver including: a first actuator comprising a deformable wire; a housing that fixes a first end and a second end of the deformable wire; and an operating structure through which the deformable wire is routed, wherein the operating structure is configured move the display element in a first direction in conjunction with a length variation of the deformable wire, and the operating structure includes an elastic structure configured to prevent tilt with respect to an axis in the first direction.

29 Claims, 26 Drawing Sheets

(51) Int. Cl.
*H04N 13/344* (2018.01)
*H04N 13/366* (2018.01)
*H04N 13/128* (2018.01)

(52) U.S. Cl.
CPC ......... *H04N 13/128* (2018.05); *H04N 13/344* (2018.05); *H04N 13/366* (2018.05); *G02B 2027/0134* (2013.01); *G02B 2027/0159* (2013.01); *H04N 2213/002* (2013.01)

(58) Field of Classification Search
CPC ......... G02B 2027/0159; H04N 13/128; H04N 13/344; H04N 13/366; H04N 2213/002
See application file for complete search history.

(56) References Cited

U.S. PATENT DOCUMENTS

| | | |
|---|---|---|
| 2019/0325596 A1* | 10/2019 | Richards ............... G01S 7/4814 |
| 2020/0096816 A1 | 3/2020 | Lee et al. |
| 2020/0226671 A1 | 7/2020 | Shin et al. |
| 2021/0011545 A1 | 1/2021 | Min |
| 2021/0132396 A1 | 5/2021 | Shin et al. |

* cited by examiner

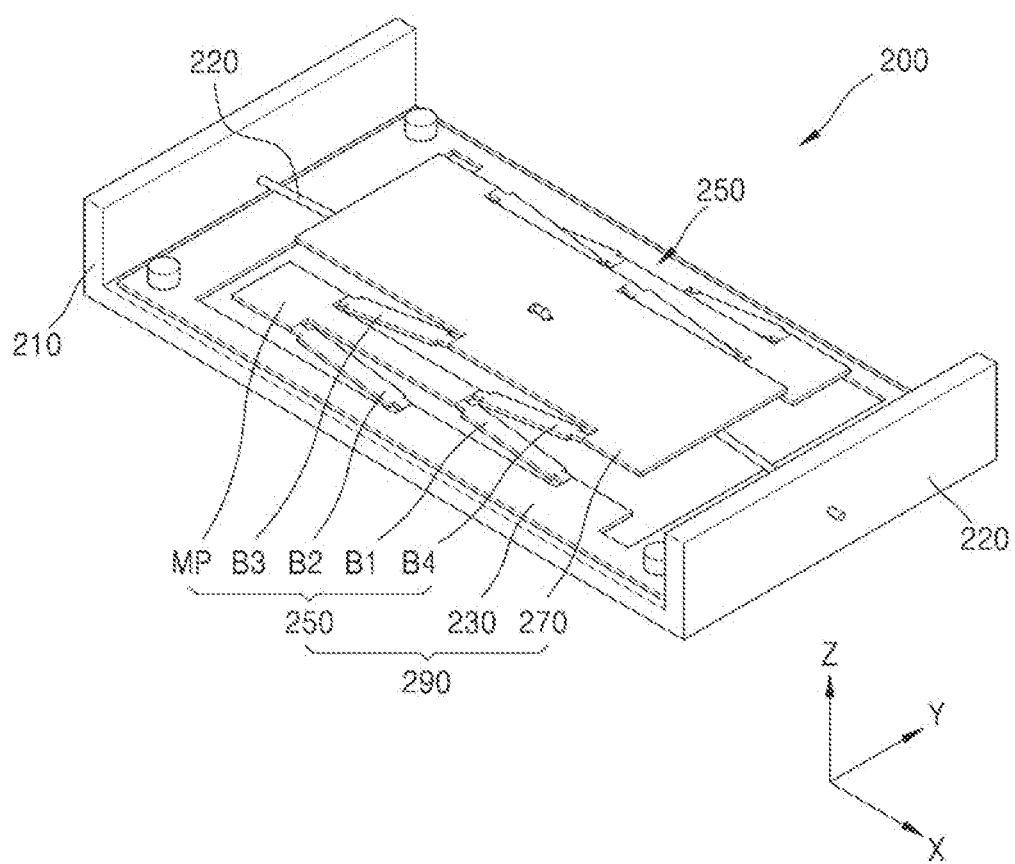

IMAGE DISPLAY DEVICE CAPABLE OF MULTI-DEPTH EXPRESSION

CROSS-REFERENCE TO RELATED APPLICATIONS

This application claims priority to Korean Patent Application No. 10-2020-0026123, filed on Mar. 2, 2020, in the Korean Intellectual Property Office, and to Korean Patent Application No. 10-2020-0165075, filed on Nov. 30, 2020, in the Korean Intellectual Property Office, the disclosures of which are incorporated by reference herein in their entirety.

BACKGROUND

1. Field

Example embodiments consistent with the present disclosure relate to an image display device capable of multi-depth expression.

2. Description of Related Art

Three-dimensional (3D) image display technology is applied to various fields, and recently, it is also applied to an image display device related to a virtual reality (VR) display and an augmented reality (AR) display.

Head-mounted displays providing virtual reality (VR) are currently commercialized and are widely applied to the entertainment industry. Also, the head mount displays are being developed into forms that may be applied in medical, educational, and industrial fields.

An augmented reality (AR) display, which is an advanced form of a virtual reality display, is an image display device that combines the real world and virtual reality and may induce interaction between the real world and the virtual reality. An interaction between the real world and virtual reality is based on a function for providing real-time information about a real situation, and an effect of reality may be further increased by overlaying virtual objects or information on the real-world environment.

In such a device, stereoscopy technology is commonly used for displaying a 3D image. At this time, visual fatigue due to a Vergence-Accommodation mismatch may be involved. Therefore, various structures for expressing depths are being sought as a 3D image display method capable of reducing visual fatigue.

SUMMARY

One or more example embodiments provide an image display device capable of expressing various depths.

Additional aspects will be set forth in part in the description which follows and, in part, will be apparent from the description, or may be learned by practice of the presented embodiments of the disclosure.

In accordance with an aspect of an example embodiment, an image display device includes a display element configured to modulate light to form an image; a light transfer unit configured to transmit the formed image to eyes of an observer, the light transfer unit including a focusing member; and a driver configured to drive the display element to change a position of the display element, the driver including: a first actuator including a deformable wire; a housing that fixes a first end and a second end of the deformable wire; and an operating structure through which the deformable wire is routed, wherein the operating structure is configured to move the display element in a first direction in conjunction with a length variation of the deformable wire, and wherein the operating structure includes an elastic structure configured to prevent tilt with respect to an axis in the first direction.

The driver may move the display element in the first direction parallel to an optical axis of the display element, to change a distance between the display element and the focusing member.

The operating structure may include a moving plate on which the display element is mounted; a fixed plate fixed to the housing; and the elastic structure provided between the moving plate and the fixed plate to elastically support a movement of the moving plate with respect to the fixed plate.

The elastic structure may include a first elastic structure provided on a first side of the moving plate and a second elastic structure provided on a second side of the moving plate opposite to the first side, and the first elastic structure and the second elastic structure may be arranged to have 180° rotational symmetry with respect to the axis passing through a center of the moving plate in the first direction.

The first elastic structure and the second elastic structure may each include a 4-bar linkage structure.

The first elastic structure and the second elastic structure may each include a middle plate; two lower link bars configured to connect the middle plate to the fixed plate; and two upper link bars configured to connect the middle plate to the moving plate.

Two routing through holes may be provided at the center of the moving plate, and the deformable wire may extend from a first side of the housing, sequentially pass through the two routing through holes, and be connected to a second side of the housing.

A first fixing through hole may be provided on the first side of the housing and a second fixing through hole may be provided on the second side of the housing, and the deformable wire may be fixed through the first fixing through hole and the second fixing through hole.

The housing may include a first post facing the first fixing through hole and a second post facing the second fixing through hole, and the deformable wire may pass through the first through hole and the second through hole after surrounding each of the respective first post and the second post one or more times.

The deformable wire may include a first deformable wire configured to connect the middle plate of the first elastic structure to one side of the housing; and a second deformable wire configured to connect the middle plate of the second elastic structure to another side of the housing, wherein the first deformable wire and the second deformable wire have 180° rotational symmetry with respect to the axis passing through the center of the moving plate in the first direction.

A width of first connecting portions of the two lower link bars adjacent to the middle plate and a width of second connecting portions of the two lower link bars adjacent to the fixed plate may be smaller than widths of the other portions of the two lower link bars, and a width of third connecting portions of the two upper link bars adjacent to the middle plate and a width of fourth connecting portions of the two upper link bars adjacent to the moving plate may be smaller than widths of the other portions of the two upper link bars.

The operating structure may have an integrated structure machined from a single metal sheet.

The image display device may further include a first buckling structure supporting a position changed state of the moving plate provided on a first side of the moving plate and a second buckling structure supporting the position changed state of the moving plate provided on a second side of the moving plate different from the first side.

The housing may include a first sidewall and a second sidewall on which the first end and the second end of the deformable wire are respectively fixed and a bottom surface on which the fixed plate is fixed, wherein the first buckling structure has a strip-like shape having one end elastically coupled to the first side of the moving plate and another end elastically coupled to the first sidewall of the housing, and wherein the second buckling structure has the strip-like shape having one end elastically coupled to the second side of the moving plate and another end elastically coupled to the second sidewall of the housing.

An elastic coupling state of the first buckling structure and the second buckling structure with respect to the first sidewall, the second sidewall, the first side of the moving plate, and the second side of the moving plate may be set such that the moving plate has a stable state at two predetermined distance positions with respect to the fixed plate.

The image display device may further include a second actuator, which is provided between the moving plate and the bottom surface of the housing to provide a driving force to the moving plate, the second actuator including: a first elastic bridge having a first curved surface convexly curved toward the moving plate; a second elastic bridge having a second curved surface convexly curved toward the bottom surface; and a second deformable wire fixed to both ends of the first elastic bridge and to both ends of the second elastic bridge.

The first elastic bridge may have an elastic restoring force in a first direction in which a first radius of curvature of the first elastic bridge increases, and a center portion of the first elastic bridge may be fixed to the moving plate.

The second elastic bridge may have an elastic restoring force in a second direction in which a second radius of curvature of the second elastic bridge increases, and a center portion of the second elastic bridge may be fixed to the bottom surface of the housing.

The second actuator may provide the driving force such that the moving plate is moved away from the fixed plate, and the first actuator may provide an opposite driving force such that the moving plate is moved toward the fixed plate.

When a length of the second deformable wire is shortened, the moving plate may be moved away from the fixed plate, and when a length of the deformable wire of the first actuator is shortened, the moving plate may be moved toward the fixed plate.

Power may be applied to the first actuator and the second actuator only while a length of the deformable wire of the first actuator and a length of the second deformable wire are being changed.

The deformable wire may include a material that is deformable by heat.

The deformable wire may include a shape memory alloy or an electroactive polymer.

The light transfer unit may transmit the formed image to the eyes of the observer as an enlarged image on a virtual image plane at a predetermined position.

The image display device may further include a processor configured to generate a driving signal to control the driver based on image information, wherein the image information includes depth information in conjunction with a position of a virtual image plane for each image of a plurality of frames included in the image information, and wherein the processor generates the driving signal according to the depth information.

The light transfer unit may combine first light including the formed image; and second light comprising a second image of a real environment in front of the observer and transmit the combined first light and second light to the eyes of the observer.

The light transfer unit may further include a beam splitter provided obliquely with respect to a first traveling path of the first light and with respect to a second traveling path of the second light.

The display element may include a first display element and a second display element, wherein the driver includes a first driver and a second driver for respectively driving the first display element and the second display element, to change respective positions of the first display element and the second display element, and wherein the light transfer unit includes a first light transfer unit and a second light transfer unit that transmit images formed by the first display element and the second display element to a left eye and a right eye of the observer, respectively.

The image display device may further include a processor configured to control the display element based on image information, wherein the image information includes information about a pair of a left-eye image and a right-eye image to be recognized as a single frame 3D image, and wherein the processor controls the first display element and the second display element, such that the left-eye image is formed by the first display element and the right-eye image is formed by the second display element.

BRIEF DESCRIPTION OF THE DRAWINGS

The above and other aspects, features, and advantages of certain example embodiments will be more apparent from the following description taken in conjunction with the accompanying drawings, in which:

FIGS. 4 and 5 are a cross-sectional view and a perspective view of an example detailed configuration of the driver provided in the image display device of FIG. 1;

DETAILED DESCRIPTION

Figure 1:
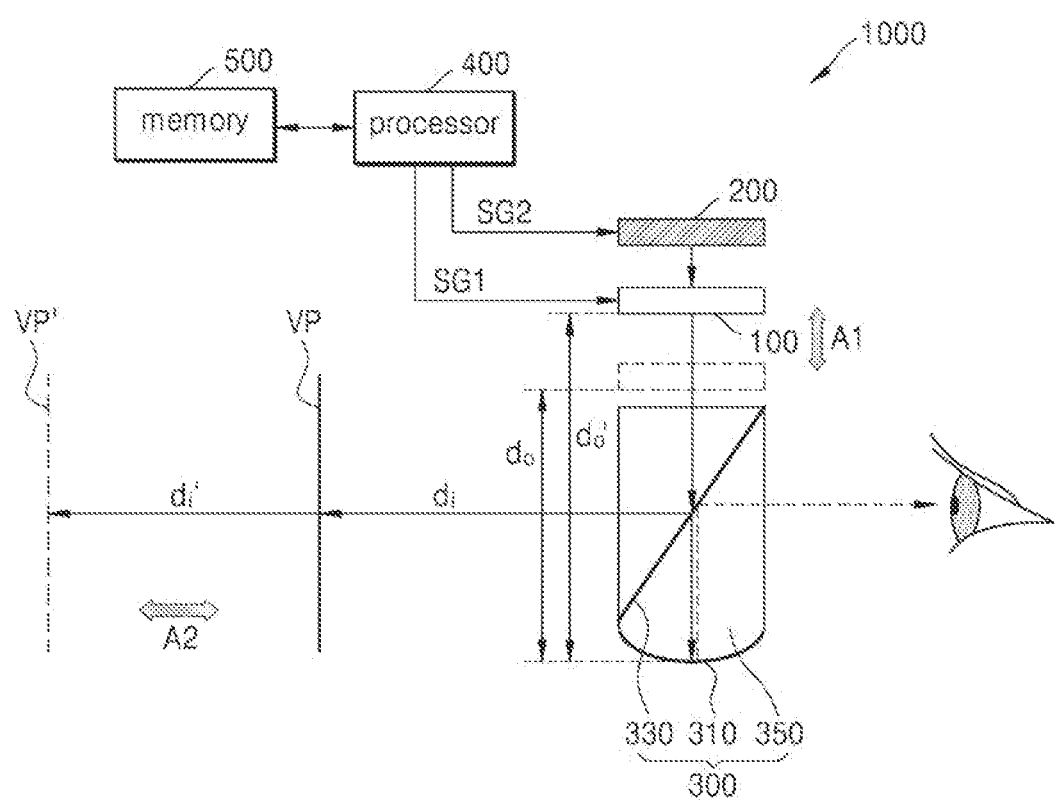
FIG. 1 is a diagram showing a configuration and an optical arrangement of an image display device according to an example embodiment.

Reference will now be made in detail to embodiments, examples of which are illustrated in the accompanying drawings, wherein like reference numerals refer to like elements throughout. In this regard, the example embodiments may have different forms and should not be construed as being limited to the descriptions set forth herein. Accordingly, the example embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, example embodiments of the disclosure will be described in detail with reference to the accompanying drawings. In the drawings, like reference numerals denote like elements, and the size and thickness of each element may be exaggerated for clarity of explanation. Meanwhile, embodiments described below are merely examples, and various modifications are possible from these embodiments.

Hereinafter, what is described as being "above" or "on" may include not only that which is directly above in contact, but also that which is above in a non-contact manner.

An expression used in the singular encompasses the expression of the plural, unless it has a clearly different meaning in the context. In addition, unless explicitly described to the contrary, the word "comprise" and variations such as "comprises" or "comprising" will be understood to imply the inclusion of stated elements but not the exclusion of any other elements.

The use of the terms "the" and similar indication words may refer to both singular and plural.

Operations that constitute a method may be performed in any suitable order, unless explicitly stated to be done in an order described. The disclosure is not limited thereto. Furthermore, the use of all example terms (e.g., etc.) is merely intended to be illustrative of technical ideas and is not to be construed as limiting the scope of the term unless further limited by the claims.

Figure 2:
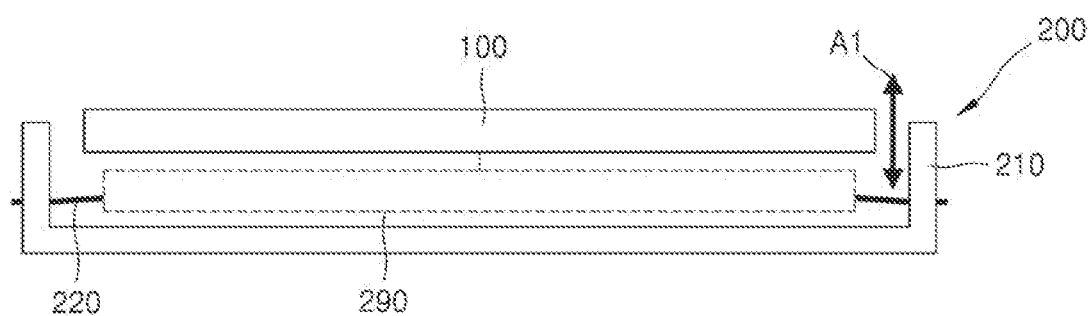
FIG. 2 is a diagram showing a schematic configuration and an operation concept of a driver provided in the image display device of FIG. 1.
Figure 3A:
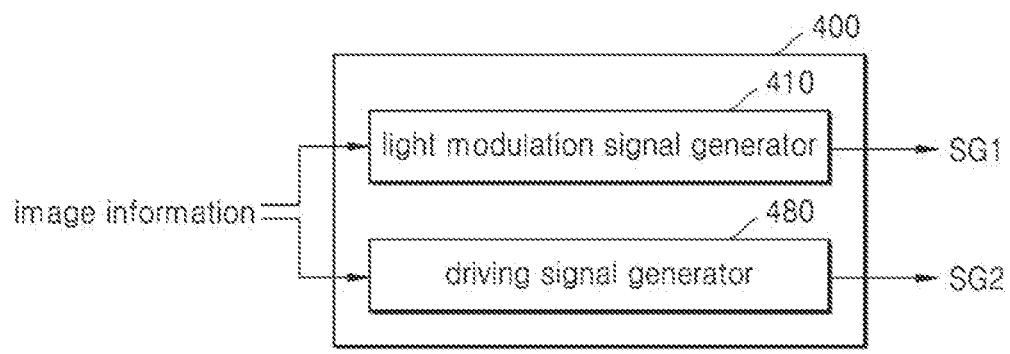
FIGS. 3A and 3B are block diagrams showing examples of a processor that may be employed in the image display device of FIG. 1.
Figure 3B:
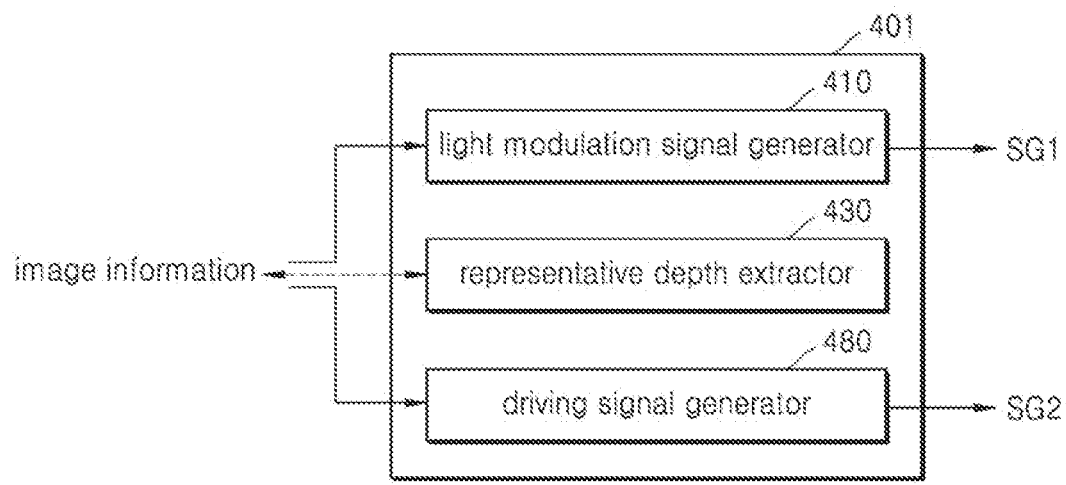

FIG. 1 is a diagram showing a configuration and an optical arrangement of an image display device according to an example embodiment, FIG. 2 is a diagram showing a schematic configuration and an operation concept of a driver provided in the image display device of FIG. 1, and FIGS. 3A and 3B are block diagrams showing examples of a processor that may be employed in the image display device of FIG. 1.

The image display device 1000 includes a display element 100 that forms an image by modulating light, a light transfer unit 300 that transmits an image formed by the display element 100 to eyes of an observer, a driver 200 that drives the display element 100 to change the position of the display element 100, and a processor 400 that controls the display element 100 and the driver 200 according to image information.

The display element 100 forms an image by modulating light according to image information regarding an image to be provided to an observer. An image formed by the display element 100 may be provided to both eyes of the observer, and in the drawing, only an optical system facing a single eye is shown for convenience of illustration. An image formed by the display element 100 may be, for example, a stereoscopic image provided to the left eye and the right eye of an observer, may be a hologram image, a light field image, or an integral photography (IP) image, and may also include a multi-view image or a super multi-view image. However, the disclosure is not limited thereto, and the image formed by the display element 100 may be a general 2D image.

The display element 100 may include, for example, a liquid crystal on silicon (LCoS) element, a liquid crystal display (LCD) element, an organic light emitting diode (OLED) display element, and a digital micromirror device (DMD), and may also include next-generation display elements like a micro LED, a quantum dot (QD) LED, etc.

Although not shown, the image display device 1000 may include a light source for providing light for forming an image to the display element 100 and may further include components like a beam splitter for adjusting an optical path, a relay lens for enlarging and reducing an image, and a spatial filter for removing noise.

The light transfer unit 300 changes an optical path of an image formed by the display element 100, forms the image to a size suitable to the field of view of an observer, and transfers the image to eyes of the observer. The light transfer unit 300 may include a focusing member 310 and may also include a beam splitter 330 as a member that diverts light to change a path.

The focusing member 310 is an imaging member having refractive power and may enlarge or reduce an image formed on the display element 100. The focusing member 310 is shown as a concave mirror, but is not limited thereto. The focusing member 310 may be a combination of a convex lens and a concave lens other than a concave mirror.

The beam splitter 330 may be a half mirror that transmits half of incident light and reflects the other half. However, the disclosure is not limited thereto, and the beam splitter 330 may be a polarization beam splitter that transmits or reflects incident light according to polarization. When the beam splitter 330 is a polarization beam splitter, additional optical elements for polarization switching may be further provided in the light transfer unit 300.

As illustrated, the focusing member 310 and the beam splitter 330 are fixed in a transparent light guiding member 350, and thus the light transfer unit 300 may have an integral structure. However, it is merely an example, and embodiments are not limited thereto.

The light transfer unit 300 transmits not only light containing an image formed by the display element 100 to eyes of an observer, but also light containing an image of real environment in front of the observer to the eyes of the observer. Therefore, the image display device 1000 may function as a see-through type display.

The shape and the configuration of the light transfer unit 300 are not limited to those shown in the drawings. Additional optical elements for transmitting an image formed by the display element 100 to pupils of an observer along with an image of a real environment in front of the observer may be further provided, and optical windows of various shapes and structures may be employed.

Light of an image formed by the display element 100 is transmitted to eyes of an observer by passing through the beam splitter 330, is reflected by the focusing member 310, and then is reflected by the beam splitter 330 again. In this path, the observer recognizes a virtual image formed on a virtual image plane VP at a predetermined position behind the beam splitter 310, and the depth felt by the observer differs according to positions of the virtual image plane VP.

In the image display device 1000 according to an example embodiment, the position of the virtual image plane VP is not fixed to a single value and may be changed by reflecting a sense of depth of an image to be displayed. To this end, the image display device 1000 includes the driver 200 for driving the position of the display element 100. The driver 200 may move the display element 100 in parallel (i.e., parallel to the optical axis of the display element 100), such that a distance of the display element 100 from the focusing member 310 is changed. When the position of the display element 100 is changed in a direction A1, the position of the virtual image plane VP is changed in a direction A2.

The driver 200 employed by the image display device 1000 employs a shape-variable material to widen a position driving range of the display element 100 with as small volume as possible and also employs a configuration for preventing the display element 100 from being tilted with respect to the direction A1 as much as possible while the position of the display element 100 is being changed in the direction A1.

As shown in FIG. 2, the driver 200 includes a deformable wire 220, a housing 210 that fixes both ends (i.e., a first end and a second end) of the deformable wire 220, and an operating structure 290 that transmits driving force due to deformation of the deformable wire 220 to the display element 100.

The operating structure 290 is a structure through which the deformable wire 220 is routed and includes a tilt preventing element for transmitting driving force and resilience to the display element 100 due to a change of the length of the deformable wire 220 and preventing the display element 100 from being tilted with respect to an intended operating direction, that is, the axis in the direction A1.

The deformable wire 220 may include a material whose shape is variable by heat, and the material may include a shape memory alloy or an electro active polymer.

An example detailed configuration of the driver 200 having a tilt preventing element and an operation for changing the position of the display element 100 will be described below with reference to FIGS. 4 to 8.

With reference to FIG. 3A, the processor 400 may generate a light modulation signal SG1 to be transmitted to the display element 100 and a driving signal SG2 to be transmitted to the driver 200 according to image information related to an image to be recognized by an observer. The display element 100 and the driver 200 are controlled by the light modulation signal SG1 and the driving signal SG2, respectively. In other words, an image is formed at the display element 100 by the light modulation signal SG1, and the position of the display element 100 is driven, such that the virtual image plane VP set appropriately for the image is placed.

The image display device 1000 also includes a memory 500, and various data including image information and program codes for driving the image display device 500 may be stored in the memory 500.

Referring to FIG. 3A, the processor 400 may include a light modulation signal generator 410 and a driving signal generator 480. A light modulation signal SG1 is generated by the light modulation signal generator 410 and a driving signal SG2 is generated by the driving signal generator 480, with reference to received image information.

The image information includes, for respective images of a plurality of frames to be provided to an observer, data for respective pixels related to color values of a plurality of pixels and may also include depth information in conjunction with positions of the virtual image plane VP at which the respective images are imaged.

The depth information included in the image information may be predetermined representative depth values for the respective images of the plurality of frames. The number of the depth values may be one or more.

A representative depth may be set in advance from a saliency map. A saliency map analysis may be performed to select areas that are more likely to be observed by an observer, that is, areas with high visual concentration. Brightness, colors, outlines, object sizes, etc. may be considered for selecting an area with high visual concentration. For example, an area having a greater brightness or color difference than surrounding areas, an area having a strong outline characteristic, and an area having a large object size may be selected as an area with high visual concentration. A depth value corresponding to such an area may be selected as a representative depth. Alternatively, a position with high visual concentration may be selected according to contents contained in an image.

Furthermore, by analyzing a depth map and a color map for an image, representative depths may be set according to, for example, frequencies for respective depths. Alternatively, representative depths may be set through a zone of comfort (ZOC) analysis in consideration of human visual perception characteristics.

Representative depths set as described above may be continuous values or may be a plurality of non-continuous values. In other words, not all of values for depth representation are used. Instead, representative depths may be set from among non-continuous values obtained by quantizing the values at a predetermined interval. In the case of quantizing depth values, when a representative depth value is selected for every frame for video representation, fluctuation of representative depth values selected in consecutive frames may be reduced. Therefore, the fluctuation of the consecutive positions of the display element 100 by the driver 200 may be reduced. Also, when a position of the virtual image plane VP is changed to correspond to a representative depth, a driving signal SG2 applied to the driver 200 may also be quantized and facilitates driving of the driver 200. When the same representative depth value is selected in consecutive frames, the display element 100 does not need to be driven, and thus the driving of the image display device 1000 may be further simplified.

The light modulation signal generator 410 may generate an electric signal with a pre-set color value as a light modulation signal SG1 by referring to data for respective pixels included in image information.

The driving signal generator 480 may generate a driving signal SG2 that causes the display element 100 to be moved such that a virtual image plane VP is formed at a position corresponding to a representative depth value set by referring to depth information associated with the image information. The driving signal SG2 may be, for example, an electric signal for generating appropriate heat for deformation of the deformable wire 220 provided in the driver 200.

The light modulation signal SG1 and the driving signal SG2 may be transmitted to the display element 100 and the driver 200, respectively, and thus a corresponding image may be recognized by an observer from a changed position of the virtual image plane VP.

The driving signal SG2 for driving the driver 200 may be transmitted to be delayed by a predetermined time period relative to the light modulation signal SG1. The predetermined time period may be set to be longer than the time for vergence-accommodation of eyes of an observer. This takes into account the time elapsed for human eyes to recognize an image of a changed depth position.

Referring to FIG. 3B, the processor 401 may further include a representative depth extractor 430 along with the light modulation signal generator 410 and the driving signal generator 480.

Although it is described with reference to FIG. 3A that image information includes preset depth information, the present disclosure is not limited thereto, and the processor 401 may include the representative depth extractor 430. In other words, the processor 401 extracts a representative depth for each image by referring to data for respective pixels included in the image information and reflects the representative depth to the image information again. Referring to the image information, the driving signal generator 480 may generate the driving signal SG2.

Figure 4:
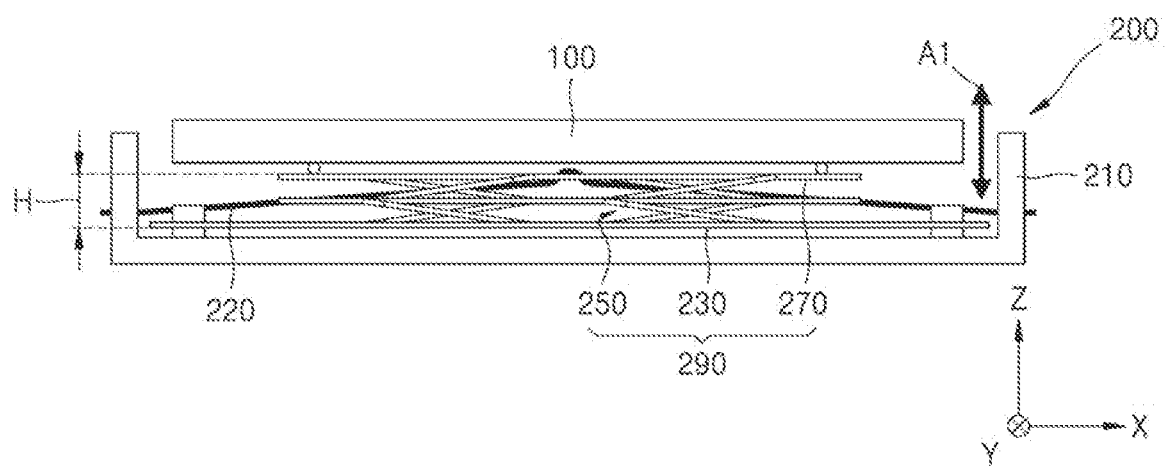

FIGS. 4 and 5 are a cross-sectional view and a perspective view of an example detailed configuration of the driver provided in the image display device of FIG. 1.

Referring to the drawings, the driver 200 includes the deformable wire 220, the housing 210 that fixes both ends of the deformable wire 220, and the operating structure 290 through which the deformable wire 220 is routed, wherein the operating structure 290 drives the display element 100 in conjunction with a length variation of the deformable wire 220.

A height H between a moving plate 270 and a fixed plate 230 may be formed by a routing pattern of the deformable wire 220, and the height H may be changed and adjusted as the moving plate 270 moves with respect to the fixed plate 230 according to a length variation of the deformable wire 220. Due to this movement, the position of the display element 100 may be changed in the direction A1.

The operating structure 290 includes the fixed plate 230 fixed to the housing 210, the moving plate 270 on which the display element 100 is mounted, and a tilt preventing element (i.e., an elastic structure), which is provided between the fixed plate 230 and the moving plate 270 and elastically supports a movement of the moving plate 270 with respect to the fixed plate 230.

The tilt preventing element is provided to prevent the display element 100 from being tilted with respect to the axis in the direction A1 when the display element 100 is moved in the direction A1 due to a movement of the moving plate 270. The tilt preventing element includes two elastic structures 250 that are respectively arranged on a first side of the moving plate 270 and a second side opposite to the first side and are 180° rotational symmetrically arranged with respect to an axis passing through the center of the moving plate 270 in the Z direction as shown in FIG. 4.

The two elastic structures 250 may each have a 4-bar linkage structure. For example, as shown in the drawings, the two elastic structures 250 may each include a middle plate MP, two lower link bars B1 and B2 connecting the middle plate MP to the fixed plate 230, and two upper link bars B3 and B4 connecting the middle plate MP to the moving plate 270.

Two routing through holes are provided at the center of the moving plate 270, and the deformable wire 220 may extend from a first side of the housing 210, sequentially pass through the two routing through holes, and be connected to a second side of the housing 210. At this time, fixing through holes are respectively provided on both sides (i.e., the first side and the second side) of the housing 210, and the deformable wire 220 may be fixed with, for example, a clamp through the fixing through holes. However, the fixing structure is merely an example, and the disclosure is not limited thereto.

Figure 6A:
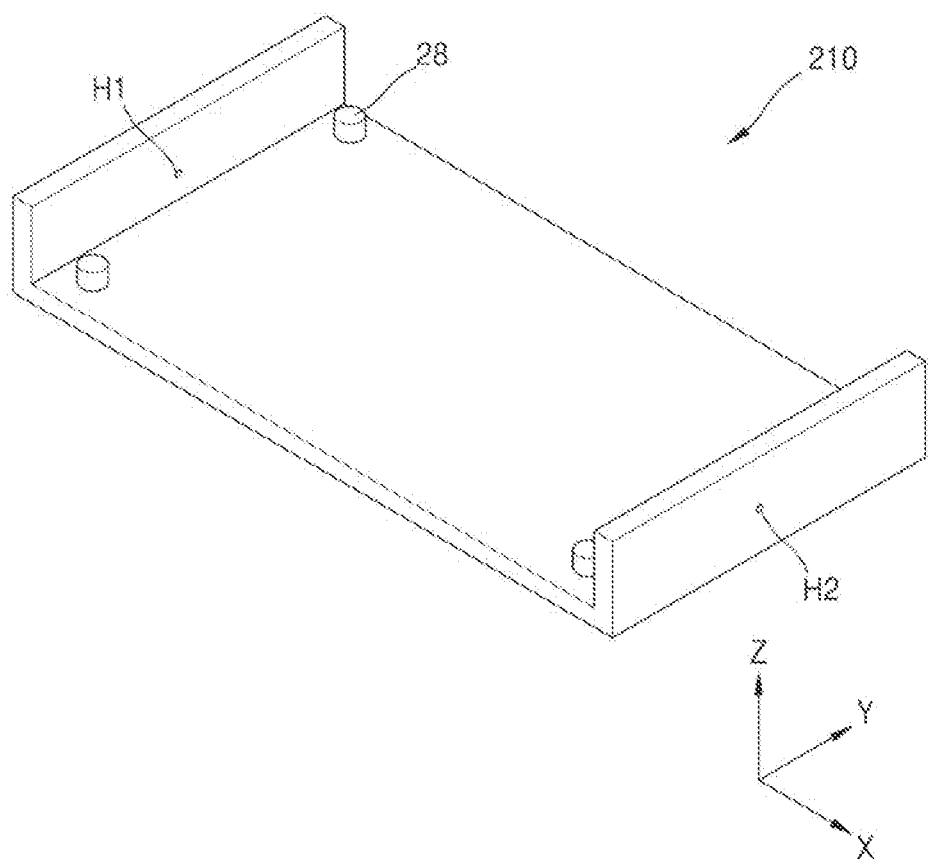
FIGS. 6A to 6C are diagrams schematically showing detailed components of the driver provided in the image display device of FIG. 1 and a manufacturing process thereof.
Figure 6B:
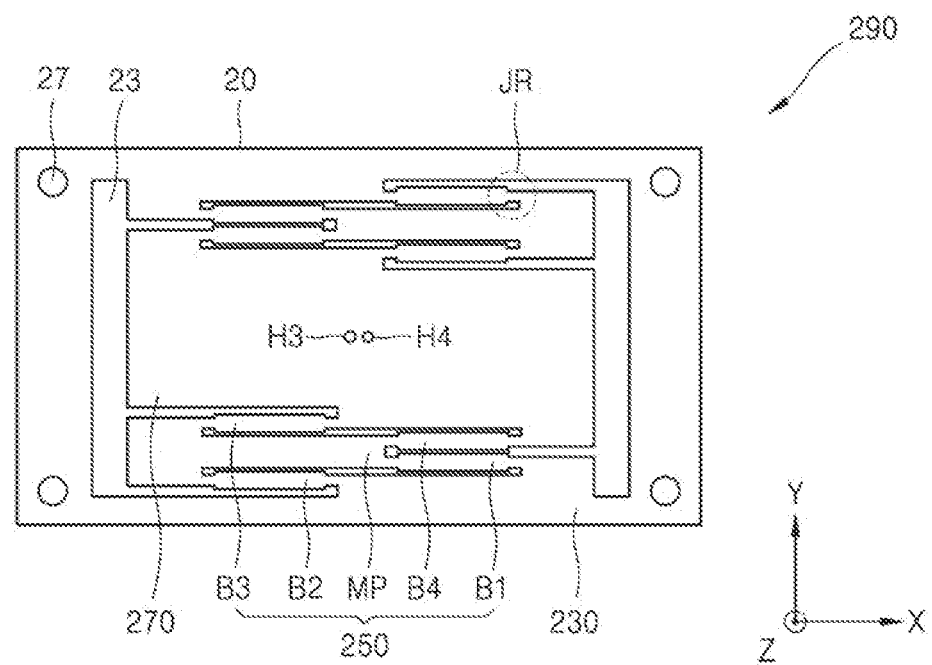
Figure 6C:
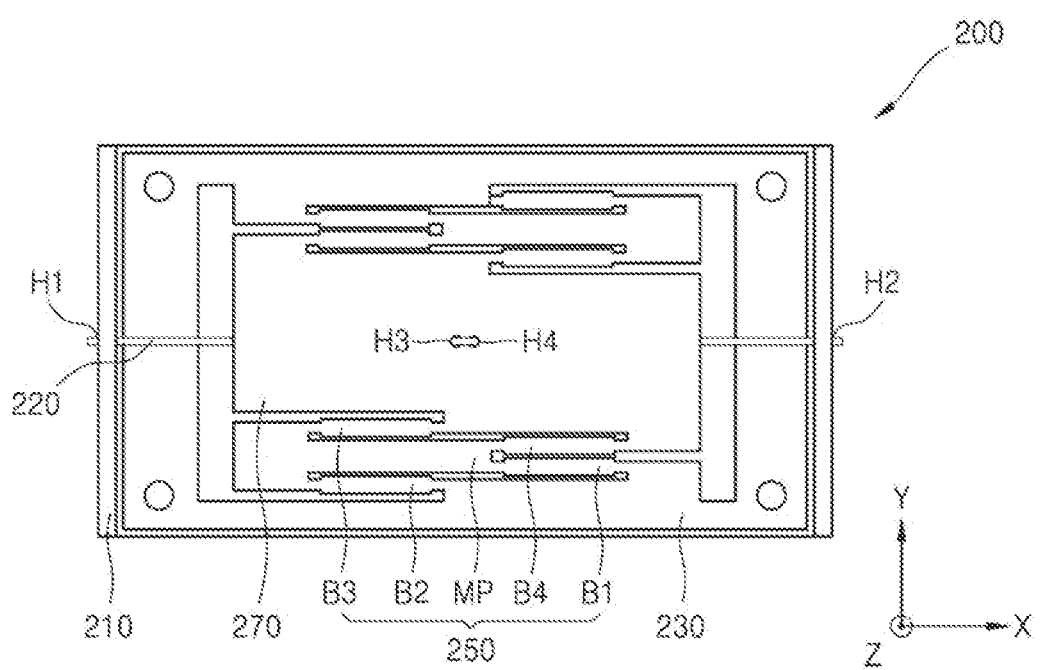

Referring to FIGS. 6A to 6C, detailed components of a driver and a manufacturing process thereof will be schematically described.

Referring to FIG. 6A, the housing 210 includes a flat plate and two walls formed on the first side and second side thereof, and fixing through holes H1 and H2 are provided on the walls. Bolts 28 for coupling the moving structure 290 may be provided at four corners of the flat plate.

Referring to FIG. 6B, the operating structure 290 may have an integral structure machined from one plate (e.g., a metal sheet 20).

Pattern holes 23 for forming shapes corresponding to the moving plate 270, the fixed plate 230, and the two elastic structures 250 may be formed on the metal sheet 20. The pattern holes 23 may be formed by using a laser. In the metal sheet 20, bolt holes 27 to be coupled with the bolts 29 of the housing 210 may also be formed.

Looking at shapes of the components constituting the elastic structure 250 including the middle plate MP, the two lower link bars B1 and B2 connecting the middle plate MP and the fixed plate 230, and the two upper link bars B3 and B4 connecting the middle plate MP and the moving plate 270, a width of first connecting portions of the lower link bars B1 and B2 adjacent to the middle plate MP and a width of second connecting portions of the lower link bars B1 and B2 adjacent to the fixed plate 230 are smaller than widths of the other portions. Similarly, a width of third connecting portions of the upper link bars B3 and B4 adjacent to the middle plate MP and a width of fourth connecting portions of the upper link bars B3 and B4 adjacent to the moving plate 270 are smaller than widths of the other portions. Such an area is indicated by a dotted circle JR. Although only one area is shown in the drawing for convenience of illustration, there are total eight areas, which serve as joints for elastic driving of the operating structure 290.

Next, referring to FIG. 6C, the operating structure 290 of FIG. 6B may be coupled to the housing 210 of FIG. 6A. At this time, the deformable wire 220 passes through two through holes H3 and H4 at the center of the moving plate 270 from a through hole H1 on the first side of the housing 210 and is coupled to a through hole H2 on the second side of the housing 210.

In this case, when the moving plate 270 is lifted upward and the length of the deformable wire 220 is appropriately adjusted, as shown in FIG. 4, the height H between the moving plate 270 and the fixed plate 230 may be determined by the deformable wire 220. This height H may be adjusted by a movement of the moving plate 270 toward the fixed plate 230 when the deformable wire 220 is contracted.

The operating structure 290 according to the above-described manufacturing method and a result structure thereof is a very light weighted rigid structure that may be repeatedly driven and has a structure capable of moving up and down precisely.

The detailed shape of the operating structure 290 illustrates that the two elastic structures 250 that elastically support either side of the moving plate 270 symmetrically with respect to the fixed plate 230 each have a 4-bar linkage structure, but the disclosure is not limited thereto. For example, the detailed shape of the elastic structure 250 may be changed to another shape capable of implementing a 4-bar linkage structure. Also, detailed shapes of the moving plate 270 and the fixed plate 230 may also be changed according to the shape of the elastic structure 250.

Figure 7:
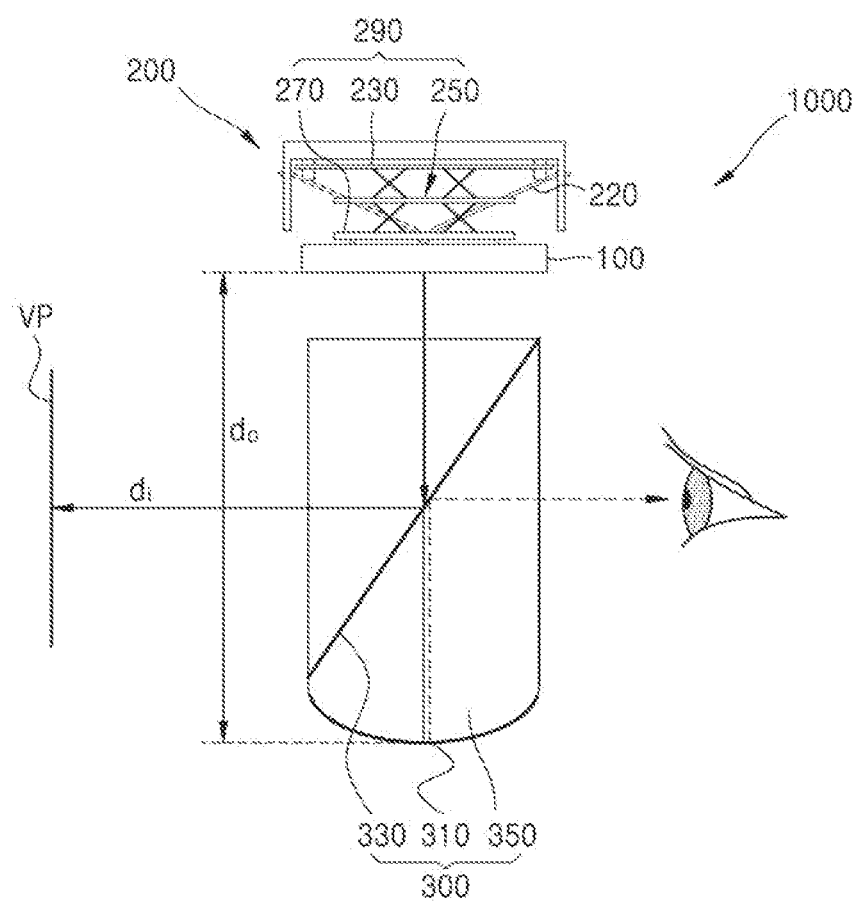
FIGS. 7 and 8 are diagrams showing example structures of the driver in the image display device of FIG. 1 and an example in which locations of a display element and an image plane are changed as the driver is driven.
Figure 8:
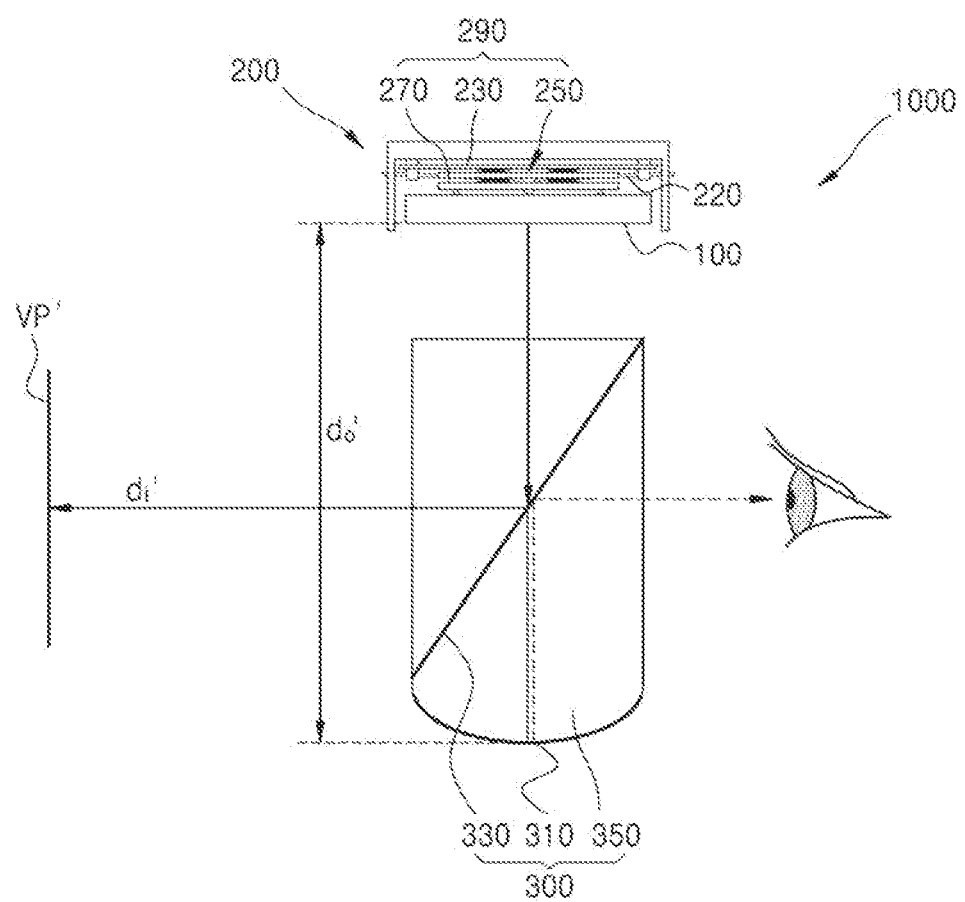

FIGS. 7 and 8 are diagrams showing example structures of the driver in the image display device of FIG. 1 and an example in which locations of a display element and an image plane are changed as the driver is driven.

Referring to FIG. 7, in an initial state in which an electrical signal is not applied to the driver 200, and more particularly, to the deformable wire 220, the display element 100 may be spaced apart by a distance $d_o$ from the focusing member 310, and a distance on an optical path from the focusing member 310 to the virtual image plane VP may be $d_i$.

Referring to FIG. 8, an electric signal, e.g., a current, is applied to the deformable wire 220, the temperature of the deformable wire 220 may be increased, and the length of the deformable wire 220 may be reduced. The degree of a variation of the length of the deformable wire 220 may be adjusted according to an electrical signal applied thereto.

When the length of the deformable wire 220 is reduced, the moving plate 270 moves toward the fixed plate 230, wherein the distance between the display element 100 and the focusing member 310 may be increased to $d_o'$, and the distance between the virtual image plane VP and the focusing member 310 may be increased to $d_i'$.

Referring back to FIG. 7, when no electric signal is applied to the deformable wire 220 again, the temperature of the deformable wire 220 may be lowered and the length thereof may be increased again. Therefore, the moving plate 270 moves away from the fixed plate 230. The distance between the display element 100 and the focusing member 310 may be reduced to $d_o$ again, and the distance between the virtual image plane VP and the focusing member 310 may be reduced to $d_i$ again. At this time, the tilt of the moving plate 270 is prevented by the two elastic structures 250 symmetrically provided on both sides between the moving plate 270 and the fixed plate 230, and thus the tilt of the display element 100 may also be prevented.

Figure 9:
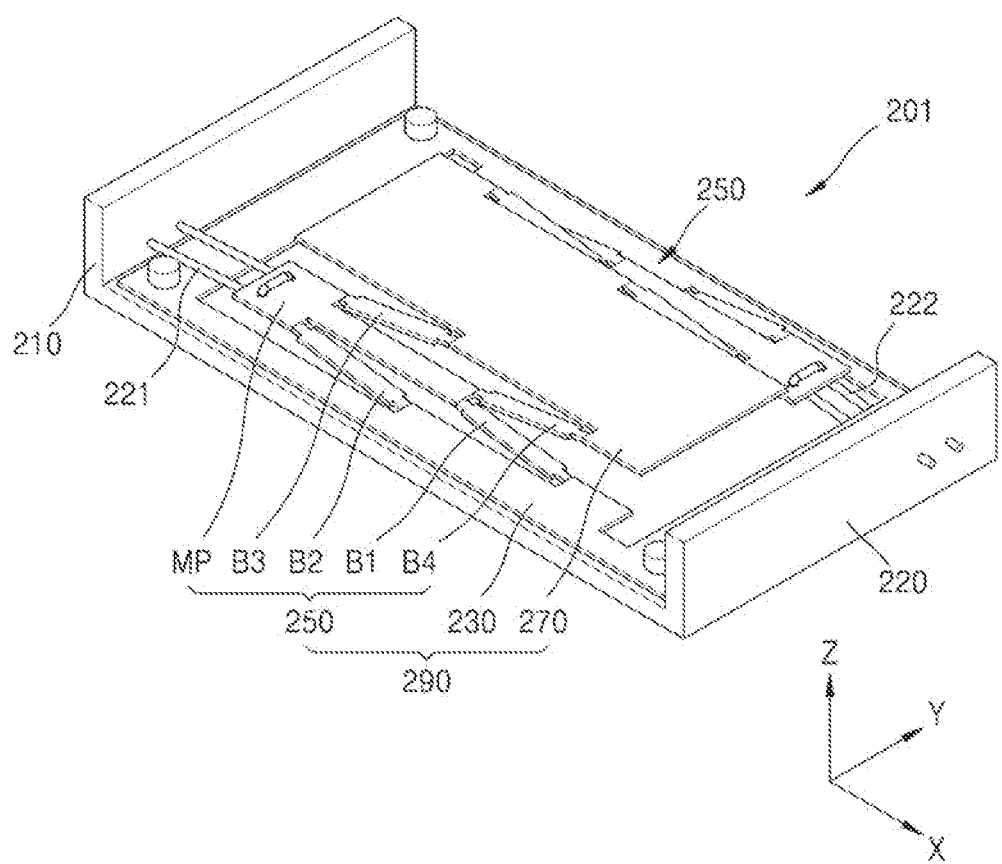
FIG. 9 is a perspective view showing a schematic configuration of a driver that may be provided in an image display device according to an example embodiment.
Figure 10:
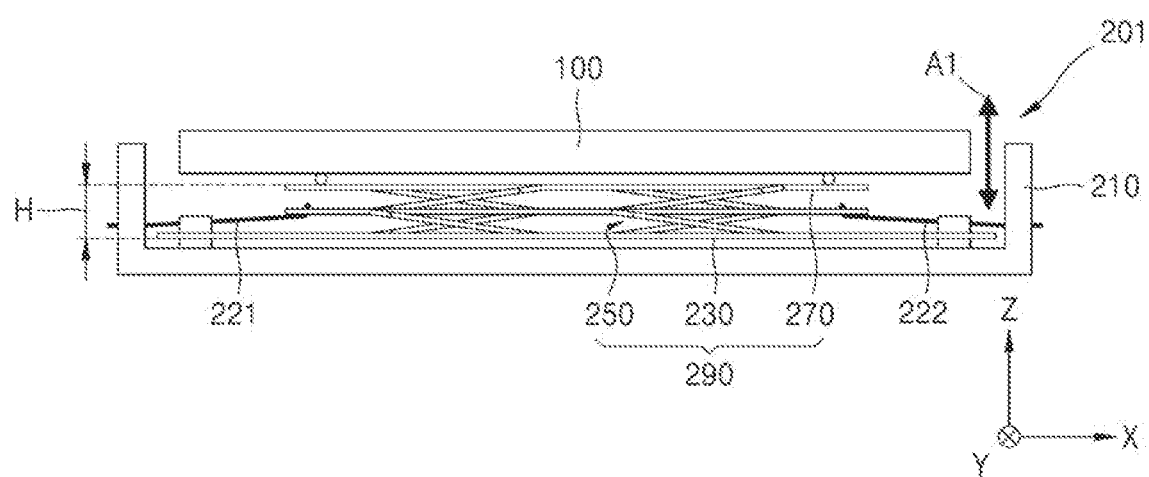
FIGS. 10 and 11 are a cross-sectional view and a plan view of the driver of FIG. 9, respectively.
Figure 11:
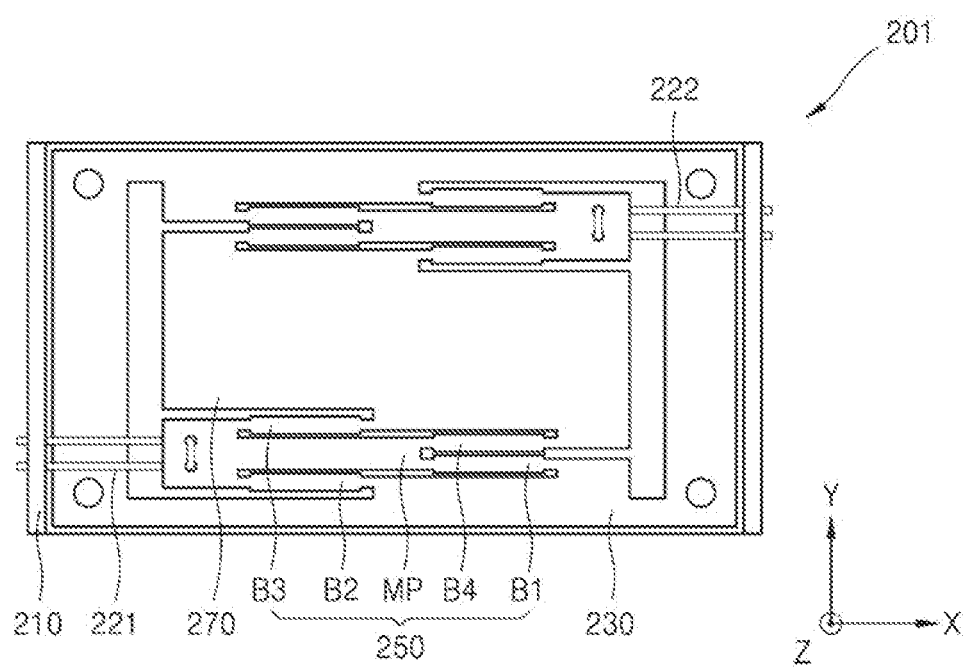

FIG. 9 is a perspective view showing a schematic configuration of a driver that may be provided in an image display device according to an example embodiment, and FIGS. 10 and 11 are a cross-sectional view and a plan view of FIG. 9, respectively.

A driver 201 is different from the driver 200 described above in FIGS. 4 to 8 in that a deformable wire is routed through the housing 210 and through the middle plate MP. The deformable wire includes a first deformable wire 221 that connects the middle plate MP to one side of the housing 210 and a second deformable wire 222 positioned diagonally to the first deformable wire 221 and connecting the other middle plate MP to the other side of the housing 210. The second deformable wire 222 is positioned 180° rotational symmetrically with respect to the first deformable wire 221 around the center of the moving plate 270.

When the first deformable wire 221 and the second deformable wire 222 are routed to the operating structure 290 in this way, the lengths of the first deformable wire 221 and the second deformable wire 222 may be reduced as compared to the length of the deformable wire 220 shown in FIG. 6C. As the lengths of the first deformable wire 221 and the second deformable wire 222 are reduced, power for driving them may be reduced.

Figure 12:
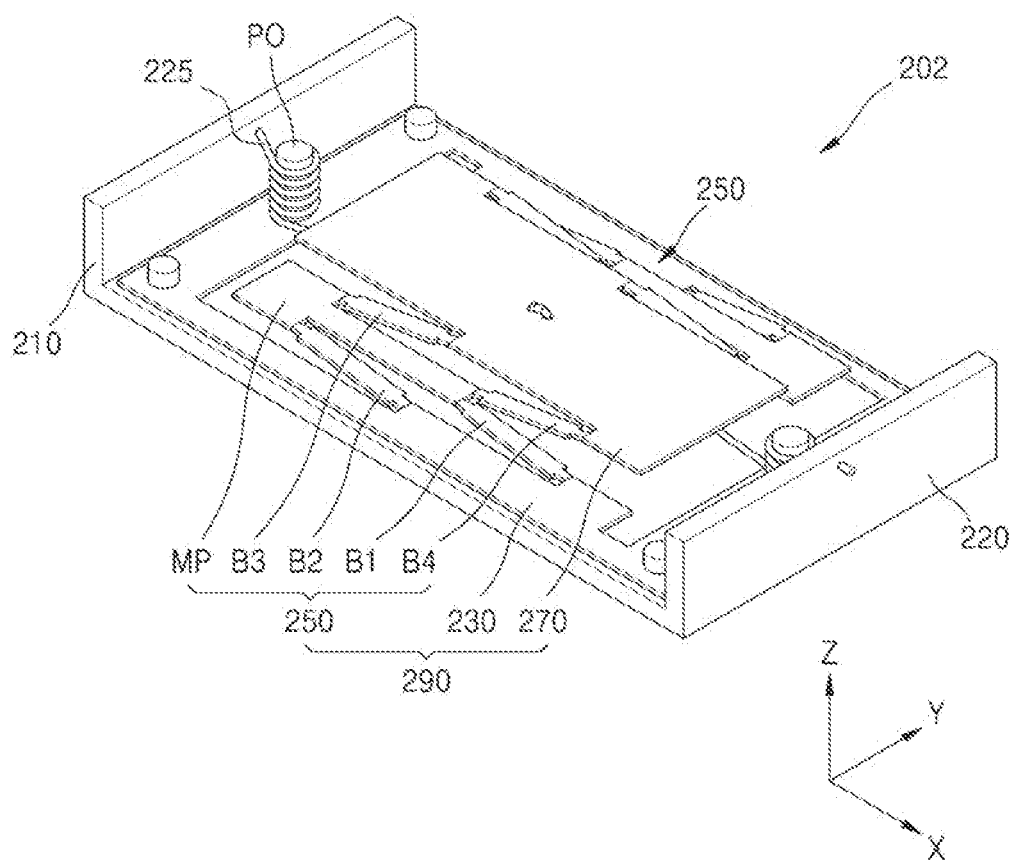
FIG. 12 is a perspective view showing a schematic configuration of a driver that may be provided in an image display device according to an example embodiment.
Figure 13:
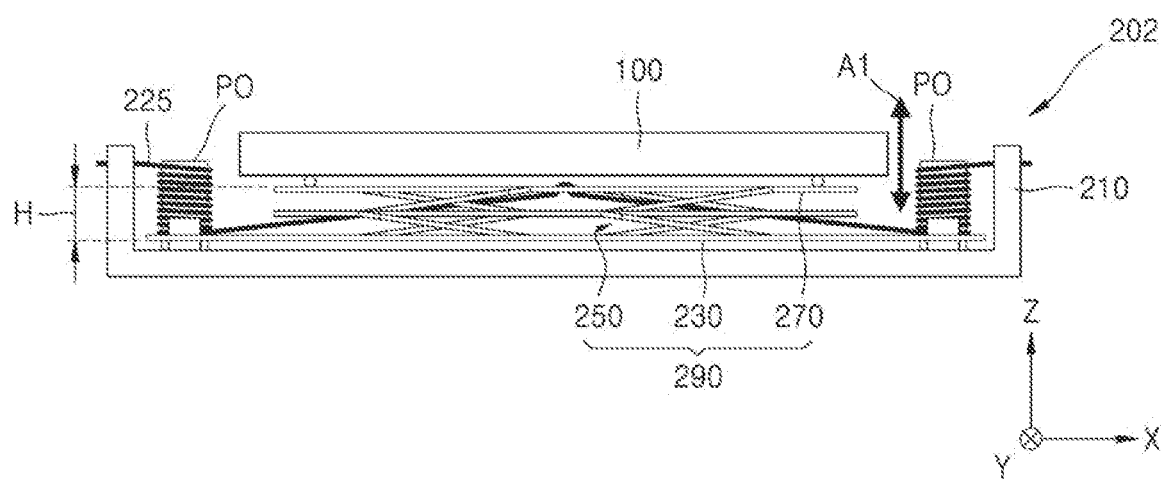
FIGS. 13 and 14 are a cross-sectional view and a plan view of the driver of FIG. 12, respectively.
Figure 14:
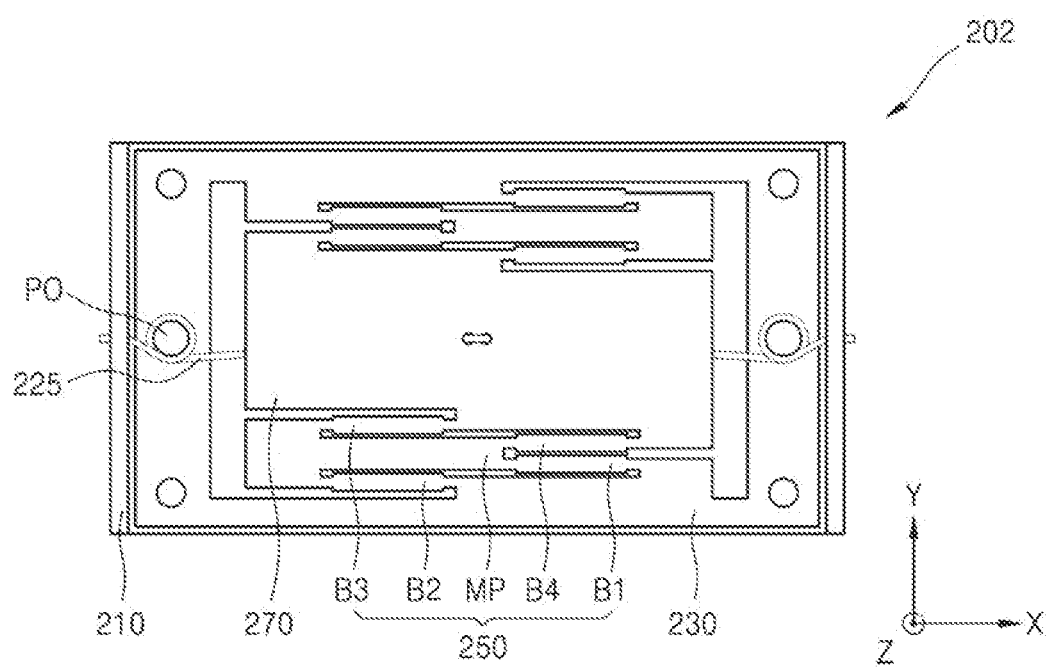

FIG. 12 is a perspective view showing a schematic configuration of a driver that may be provided in an image display device according to an example embodiment, and FIGS. 13 and 14 are a cross-sectional view and a plan view of the driver of FIG. 12, respectively.

A driver 202 is the same as the driver 200 described above in FIGS. 4 to 8 in that a deformable wire 225 is routed from the housing 210 through the moving plate 270 and is different from the driver 200 in that the deformable wire 225 is provided in the form of a coil for increased length.

The housing 210 further includes a post PO provided to face a fixing through hole H1, and the deformable wire 225 is fixed to the housing 210 after surrounding the post PO one or more times and passing through the fixing through hole H1.

When the deformable wire 225 is routed through the operating structure 290 in this manner, the length variation range of the deformable wire 220 may be increased, and thus the range of driving the display element 100 in the direction A1 may be widened.

As described above, drivers 200, 201, and 202, which may be provided in the image display device 1000 according to example embodiments, employ a shape-variable material, and thus the drivers 200, 201, and 202 having small volumes may widen a position driving range of the display element 100. The driving range of the display element 100 may be within about 1 mm. When the driving range is implemented by, for example, a voice coil motor or a piezo actuator, volume increase is very large. However, according to example embodiments, the driving range may be implemented with a smaller volume. Also, the drivers 200, 201, and 202 employ a structure in which the tilt of the display element 100 is prevented other than driving of the display element 100 in a depth-wise direction during transmission of a driving force due to deformation of a shape-variable material, and thus a tilt-free multi-depth image may be provided.

Figure 15:
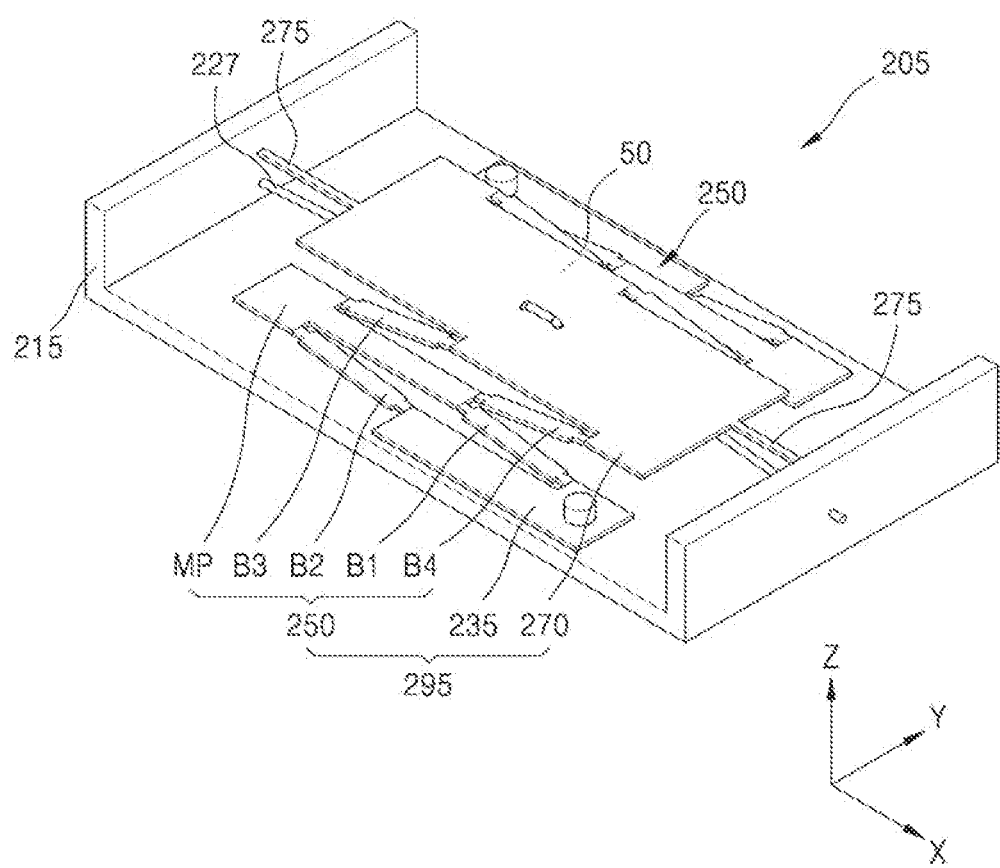
FIG. 15 is a perspective view showing a schematic configuration of a driver that may be provided in an image display device according to an example embodiment.
Figure 16:
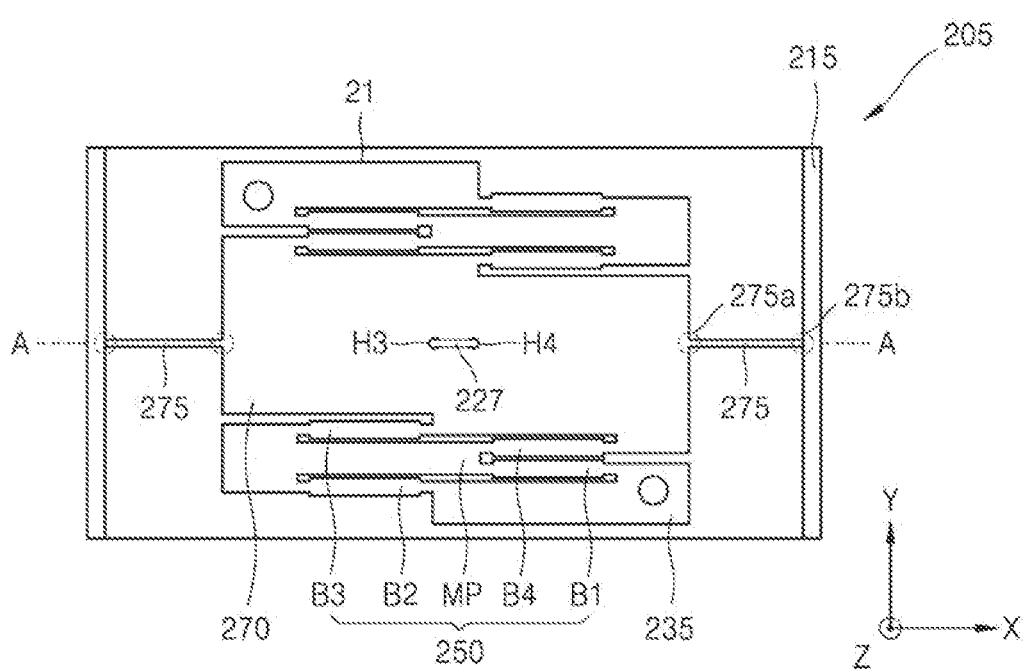
FIG. 16 is a plan view of the driver of FIG. 15.
Figure 17:
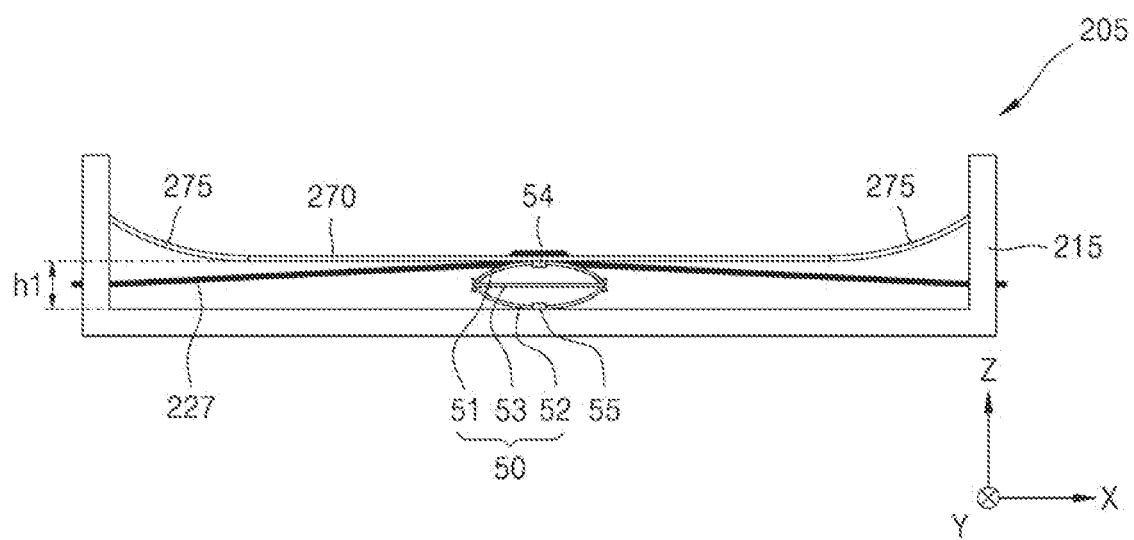
FIG. 17 is a cross-sectional view taken along a line AA of FIG. 16.

FIG. 15 is a perspective view showing a schematic configuration of a driver that may be provided in an image display device according to an example embodiment, FIG. 16 is a plan view of the driver of FIG. 15, and FIG. 17 is a cross-sectional view taken along a line AA of FIG. 16.

Similar to those in the above-stated example embodiments, in a driver 205, an operating structure 295 includes a first actuator including a first deformable wire 227, a fixed plate 235, a moving plate 270, and an elastic structure (a tilt preventing element) 250. Furthermore, unlike in the above-stated example embodiments, buckling structures 275 are formed on both sides of the moving plate 270. Also, a second actuator 50 for providing an additional driving force for the movement of the moving plate 270 may be further provided between the moving plate 270 and the bottom surface of the housing 215.

The buckling structure 275 is to support a position changed state of the moving plate 270. In other words, the moving plate 270 may stably maintain a changed position with respect to the fixed plate 235. The buckling structure 275 may have the shape of a strip that extends from one side of the moving plate 270 as shown in the drawings. The buckling structure 275 may include a first buckling structure at a first end of the moving plate 270 and a second buckling structure at a second end of the moving plate 270 as shown in FIG. 15. The first and second buckling structures are coupled to respective sides of the moving plate 270 (i.e., first and second sides) and respective sidewalls of the housing 215 (i.e., first and second sidewalls) adjacent thereto. The elastic coupling state between the buckling structure 275 and the sidewall of the housing 215 and the one side of the moving plate 270, is such that the buckling structure 275 has a stable state at a changed position when the moving plate 270 is at a predetermined position from which a distance to the fixed plate 235 varies. A coupling portion 275a at which a side of the moving plate 270 is connected to the buckling structure 275 may include a coupling groove formed in the side of the moving plate 270. Also, a coupling portion 275b at which the buckling structure 275 and a sidewall of the housing 215 are connected may also include a coupling groove. A stable state of the buckling structure 275 may be set considering the number of coupling grooves, detailed shapes of the coupling grooves, and the material constituting the buckling structure 275. In an example embodiment, the buckling structure 275 may have two stable states corresponding to two positions of the moving plate 270.

The configuration of the second actuator 50 will be described below in detail with reference to FIG. 17.

The second actuator 50 includes a first elastic bridge 51 having a curved surface convexly curved toward the moving plate 270, a second elastic bridge 52 having a curved surface convexly curved toward the bottom surface of the housing 215, and a second deformable wire 53 fixed to both ends of the first elastic bridge 51 and to both ends of the second elastic bridge 52 and having variable length.

The first elastic bridge 51 and the second elastic bridge 52 may include a plate-like material having elasticity, e.g., a metal or a plastic. Both ends of the first elastic bridge 51 and both ends of the second elastic bridge 52 are each fixed by the second deformable wire 53 having a length shorter than the length of the first elastic bridge 51 and the length of the second elastic bridge 52, and thus the first elastic bridge 51 and the second elastic bridge 52 may be bent by the second deformable wire 53 to have arch-like shapes. Therefore, the first elastic bridge 51 and the second elastic bridge 52 have elastic restoring force in a direction in which the radius of curvature increases. The convex center portion of the first elastic bridge 51 may be fixed to the lower surface of the moving plate 270 by using, for example, a fixed plate 54. Also, the convex center portion of the second elastic bridge 52 may be fixed to the inner bottom surface of the housing 215 by using, for example, a fixed plate 55. As a result, when the first elastic bridge 51 and the second elastic bridge 52 are elastically deformed, the convex center portion of the first elastic bridge 51 may not slip on the lower surface of the moving plate 270, and the convex center portion of the second elastic bridge 52 may not slip on the bottom surface of the housing 215.

Like the first deformable wire 227, the second deformable wire 53 may be configured to vary in length according to electrical control and may include a material that may be changed to a predetermined shape by a particular driving signal, e.g., a shape memory alloy (SMA) or an electro-active polymer. The SMA may include, for example, a nickel-titanium (Ni—Ti) alloy, a copper-zinc (Cu—Zn) alloy, a gold-cadmium (Au—Cd) alloy, an indium-titanium (In—Ti) alloy, etc. In this case, when a driving voltage is applied to the second deformable wire 53, heat is generated by the second deformable wire 53, and a contraction deformation of the second deformable wire 53 may occur due to the heat. Also, when a driving voltage is not applied to the second deformable wire 53, the second deformable wire 53 may be extended to its original length.

Figure 18A:
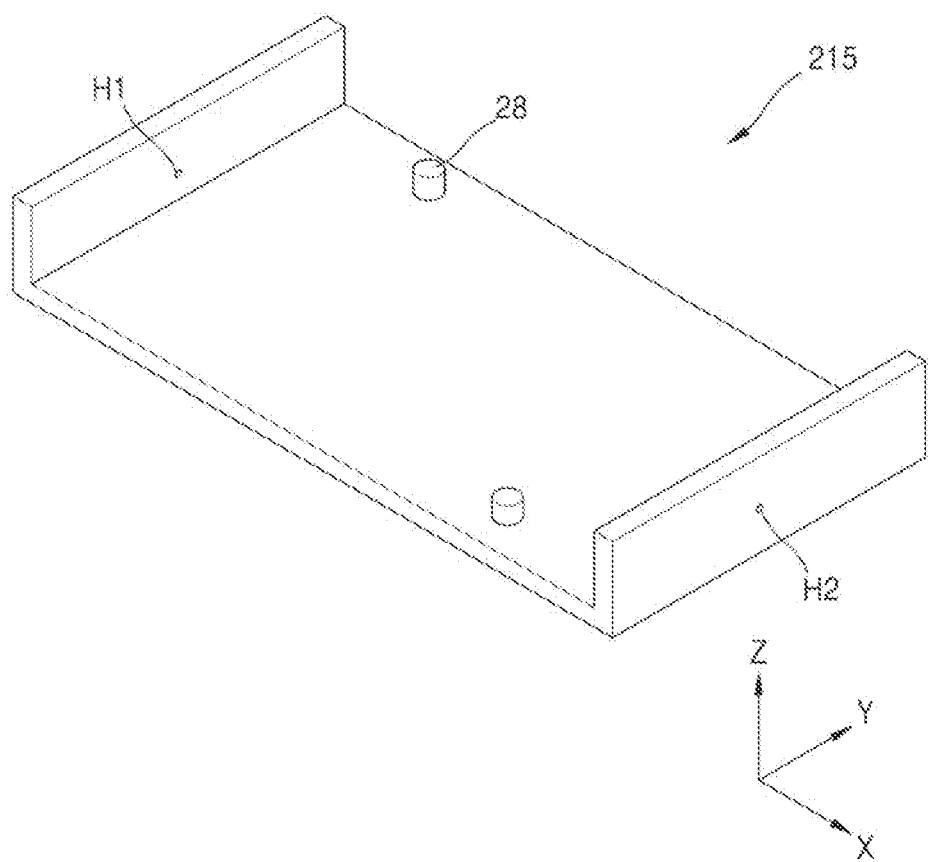
FIGS. 18A to 18C are diagrams for describing the components of FIG. 15 and a process for combining the same.
Figure 18B:
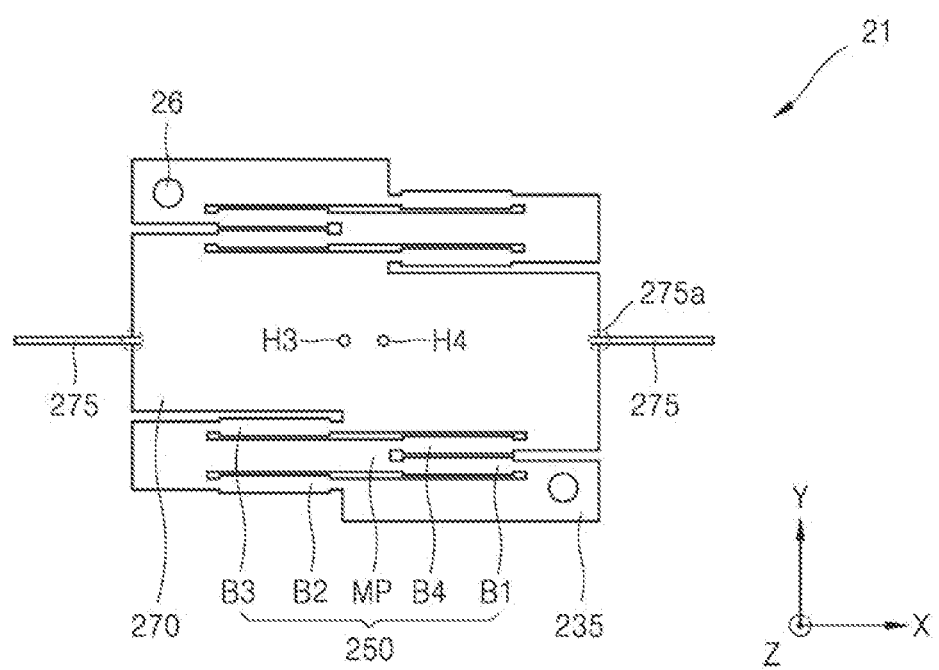
Figure 18C:
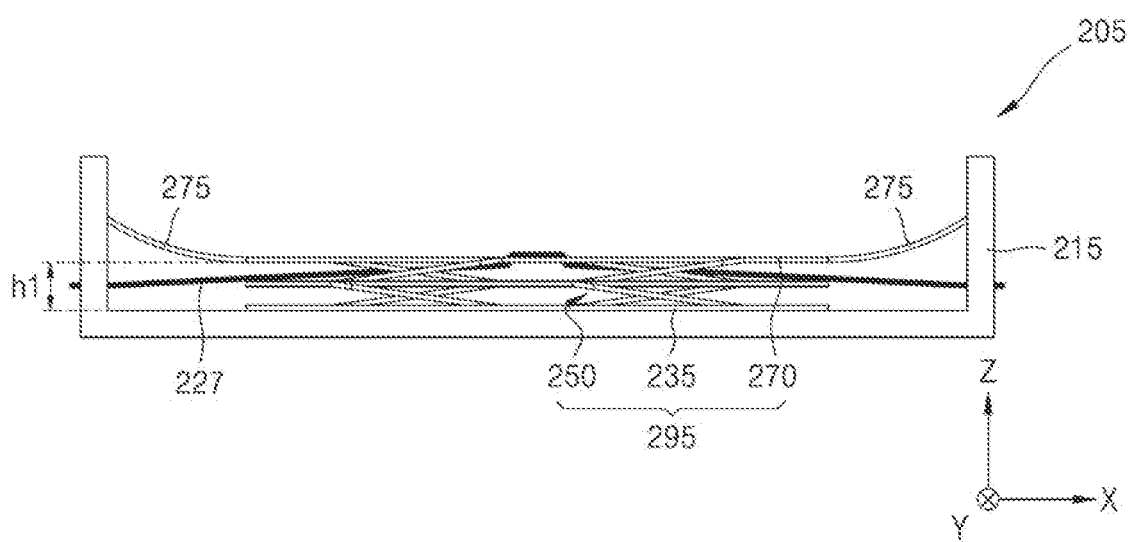

FIGS. 18A to 18C are example diagrams of the components of FIG. 15 and a process for combining the same.

Referring to FIG. 18A, the housing 215 includes a flat plate and a sidewall formed on both sides thereof, and the fixing through holes H1 and H2 are provided on the sidewalls. The bolts 28 for coupling a moving structure 295 may be provided at two corners of the flat plate.

Referring to FIG. 18B, the fixed plate 235, the elastic structure 250, the moving plate 270, and the buckling structure 275 may have an integrated structure fabricated from one plate, e.g., a metal sheet 21.

The metal sheet 21 may be patterned into a shape corresponding to the moving plate 270, the elastic structure 250, the fixed plate 235, and the buckling structure 275, and a detailed pattern for forming an elastic structure 250 and a detailed pattern of the coupling portion 275a for setting a coupling shape with the buckling structure 275 may be formed. Bolt holes 26 may be formed to be coupled to the bolts 28 of the housing 215.

Next, referring to FIG. 18C, the structure of FIG. 18B is coupled to the housing 215 of FIG. 18A. At this time, the first deformable wire 227 is coupled to the fixing through-hole H2 of the other side of the housing 220 via two fixing through-holes H3 and H4 of the center portion of the moving plate 270 from the fixing through-hole H1 of one side of the housing 215. Also, as shown in FIG. 17, the second actuator 50 is coupled between the lower portion of the moving plate 270 and the bottom surface of the housing 215. FIG. 18C is a side view of the driver 205, in which the second actuator 50 positioned at the center portion thereof is omitted to show the shape of the elastic structure 250 in detail.

In this case, when the moving plate 270 is lifted upward and the length of the first deformable wire 227 is appropriately adjusted, a height h1 may be formed between the bottom surface of the housing 215 and the moving plate 270 by the first deformable wire 227. This height h1 may be adjusted by a movement of the moving plate 270 toward the fixed plate 235 when the first deformable wire 227 is contracted.

FIGS. 17 and 18C are diagrams showing a first driving state in which the position of the moving plate 270 is set at the height h1, which is caused by application of an electric signal for contracting the length of the first deformable wire 227. The length of the second deformable wire 53 is an uncontracted initial length. After shrinking the length of the first deformable wire 227 to form such a state, the buckling structure 275 has a downwardly curved stable state as shown in FIG. 18C, and the position of the moving plate 270 is maintained by the buckling structure 275. In other words, after the height h1 is set, the state may be maintained even when an electrical signal is not applied to the first deformable wire 227 and the first deformable wire 227 and the length of the first deformable wire 227 is extended to its original state. In other words, there is no additional power consumption to maintain the height h1.

For driving the position of the moving plate 270 away from the fixed plate 235, the second actuator 50 operates.

Figure 19A:
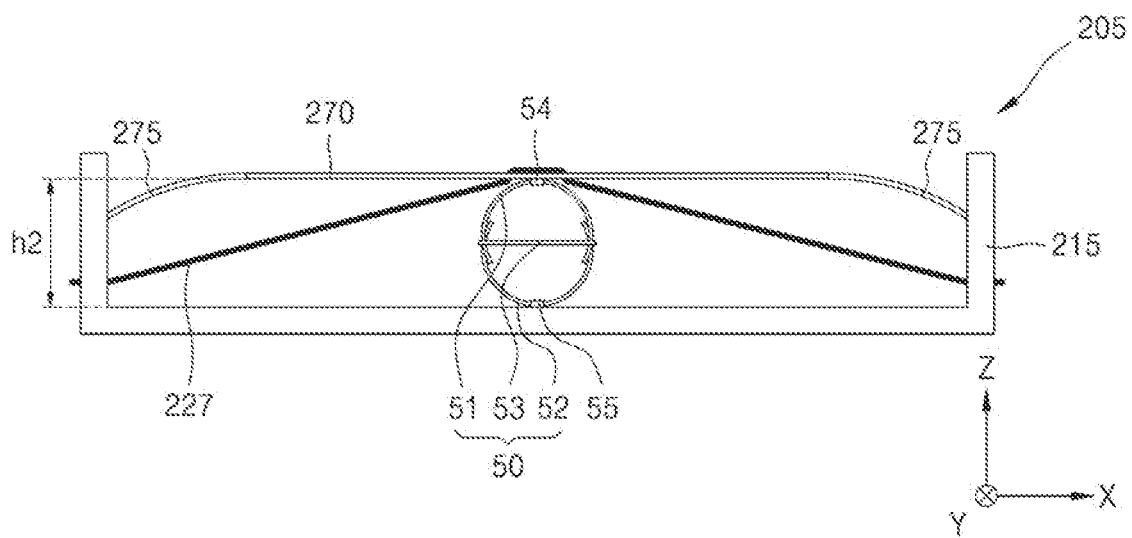
FIGS. 19A and 19B are a cross-sectional view and a side view of the driver of FIG. 15 in a second driving state.
Figure 19B:
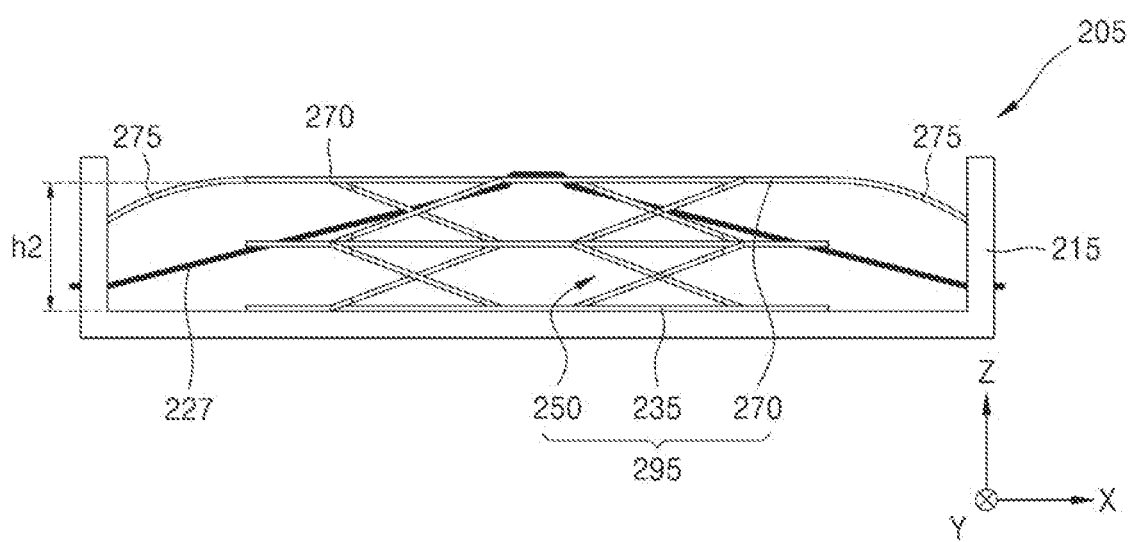

FIGS. 19A and 19B are a cross-sectional view and a side view of the driving unit of FIG. 15 in a second driving state.

An electrical signal is applied to the second deformable wire 53, the second deformable wire 53 is contracted, both ends of the first elastic bridge 51 are pulled toward each other, and both ends of the second elastic bridge 52 are pulled toward each other. In other words, the radius of curvature of the first elastic bridge 51 and the radius of curvature of the second elastic bridge 52 are reduced due to the contraction force of the second deformable wire 53. Therefore, force is applied to the moving plate 270 in a direction away from the fixed plate 235 and the height from the bottom surface of the housing 215 of the moving plate 270 is changed to h2.

In this second drive state, the buckling structure 275 is in an upwardly curved stable state as shown in FIG. 19A, and the position of the moving plate 270 is maintained by the buckling structure 275. In other words, after the height h2 is set, even when an electrical signal is not applied to the second deformable wire 53, the position of the moving plate 270 coupled to the buckling structure 275 may be maintained according to a stable state of the buckling structure 275. In other words, there is no additional power consumption to maintain the height h2.

As described above, power is applied only while the length of the first deformable wire 227 and the length of the second deformable wire 53 are being changed. In other words, power is consumed only while the position of the display element 100 (FIG. 1) provided on the moving plate 270 is being changed.

Since the location of a display element is fixed by using the buckling structure 275 while the depth of an image is being maintained, power is not consumed. Therefore, power consumption of the display device 100 may be reduced while maintaining a depth of the image.

Figure 20:
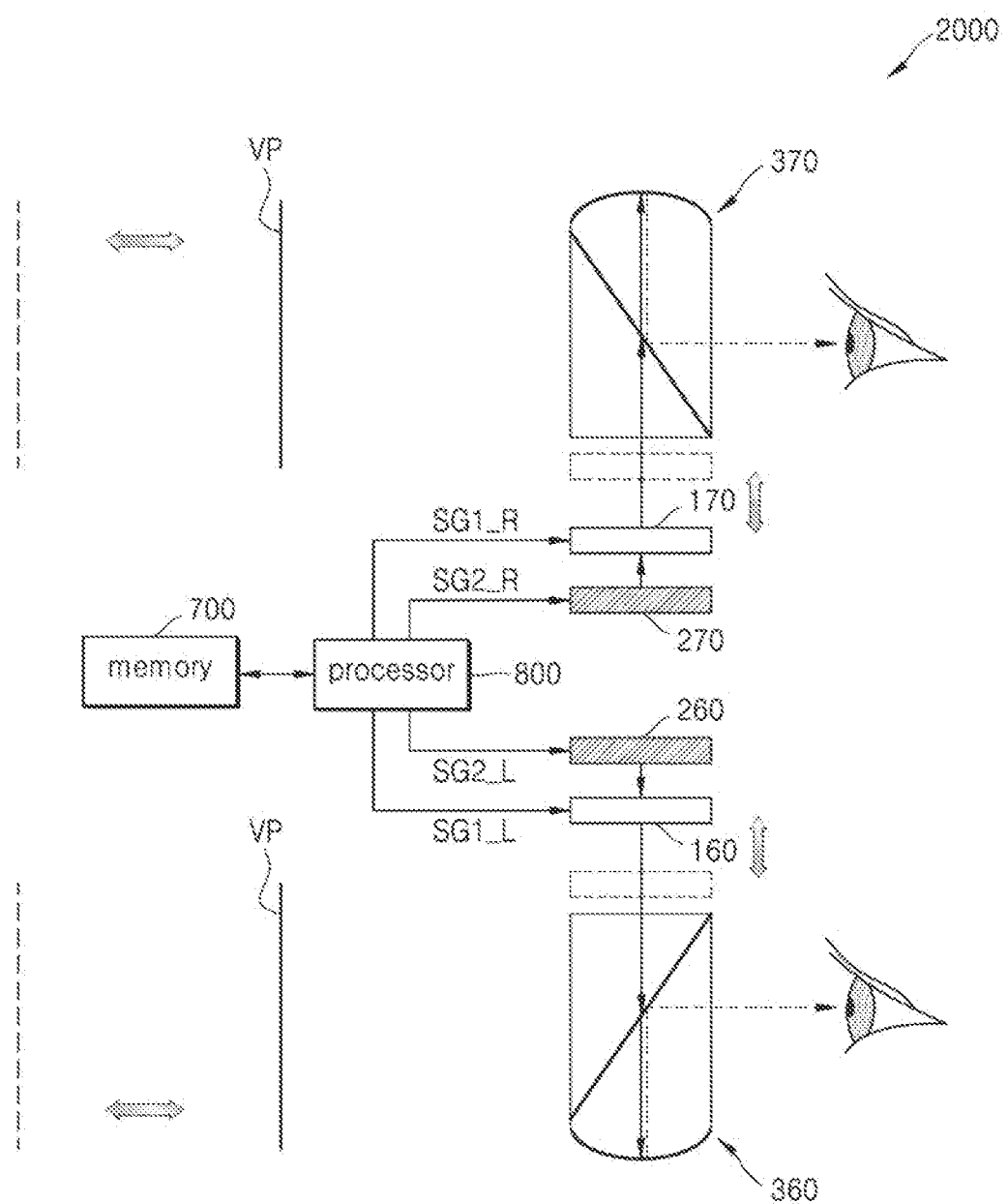
FIG. 20 is a diagram showing a configuration and an optical arrangement of an image display device according to an example embodiment.

FIG. 20 is a diagram showing a configuration and an optical arrangement of an image display device according to an example embodiment.

An image display device 2000 may include a first display element 160, a first driver 260, a first light transfer unit 360, a second display element 170, a second driver 270, and a second light transfer unit 370.

The first driver 260 and the second driver 270 drive positions of the first display element 160 and the second display element 170, respectively, and the first light transfer unit 360 and second light transfer unit 370 transmits images formed by the first display element 160 and the second display element 170 to a left eye and a right eye of an observer, respectively.

The image display device 2000 also includes a processor 800 and a memory 700, and the processor 800 controls the first display element 160, the second display element 170, the first driver 260, and the second driver 270 according to image information stored in the memory 700. The processor 800 may include a light modulation signal generator 810 and a driving signal generator 880, and program codes for executing them may be stored in the memory 700.

The image information stored in the memory 700 may include information regarding a pair of a left-eye image and a right-eye image that may be recognized as a single frame 3D image. The left-eye image and the right-eye image have a predetermined disparity. The processor 800 generates optical modulation signals SG1_L and SG1_R, such that a left-eye image is formed by the first display element 160 and a right-eye image is formed by the second display element 170, and controls the first display element 160 and the second display element 170 according to the optical modulation signals SG1_L and SG1_R.

The image information may further include depth information in conjunction with respective positions of the virtual image plane VP to which a left-eye image and a right-eye image are to be imaged, and the processor 800 generates driving signals SG2_L and SG2_R according to the depth information (that is, to form the virtual image plane VP at a position at a set depth) and control the first driver 260 and the second driver 270. The depth information may be set in advance for an image of each frame and stored in the memory 700, or depth information set due to an execution of a representative depth extractor provided in the processor 800 may be reflected to image information.

The first driver 260 and the second driver 270 may employ the structure of any one of the above-stated drivers 200, 201, and 202 capable of providing depth variation without a tilt of an image by providing a tilt preventing element or a modified structure thereof.

The image display device 2000 according to an example embodiment may express a 3D image by combining a binocular parallax method with a depth expression. For an image including an object at a predetermined depth position, by appropriately adjusting the position of a virtual image plane VP on which the image is imaged, vergence accommodation conflict (VAC) may be reduced. Also, for an image in which objects exist at various depth positions, a virtual image plane VP may be formed by using a depth position of a main object set according to a saliency map as a representative depth position, and depth sense related to the other depth positions may be expressed through binocular parallax, and thus a 3D image may be recognized.

The image display device 1000 or 2000 described above may be configured as a wearable device. All or some of components of an image display devices may be configured as a wearable device.

For example, the image display device 1000 or 2000 may be implemented in the form of a head mounted display (HMD). However, the present disclosure is not limited thereto, and the image display device 1000 or 2000 may be implemented as a glasses-type display or a goggle-type display.

The image display devices 1000 and 2000 described above are capable of showing an image formed on a display element and an image of the real world together to an observer, and thus the image display devices 1000 and 2000 may be applied to implementation of augmented reality (AR).

The AR may further increase the effect of reality by displaying a virtual object or information on a real-world environment. For example, at a location of an observer, additional information about the real-world environment may be formed by an image forming unit and provided to the observer. Such an AR display may be applied to a ubiquitous environment or an Internet of Things (IoT) environment.

The image of the real world is not limited to an image of a real environment and may be, for example, an image formed by another image device. Therefore, the above-described image display device may be implemented as a multi-image display device displaying two images together.

The image display device 1000 or 2000 described above may operate in conjunction with or connected to another electronic device, e.g., a smart phone. For example, a processor that drives the image display device 1000 or 2000 may be provided in a smart phone. Furthermore, the image display device 1000 or 2000 described above may be provided in a smart phone.

According to the above-described image display device, it is possible to express a wide range of depths with a compact structure, and tilt of an image does not occur when a display device is driven.

The above-described image display device may provide a 3D image combining binocular parallax and depth expression.

The above-described image display may be easily applied to a wearable device, and may be applied to, for example, a glasses-type augmented reality display device.

It should be understood that example embodiments described herein should be considered in a descriptive sense only and not for purposes of limitation. Descriptions of features or aspects within each example embodiment should typically be considered as available for other similar features or aspects in other embodiments. While example embodiments have been described with reference to the figures, it will be understood by those of ordinary skill in the art that various changes in form and details may be made therein without departing from the spirit and scope as defined by the following claims.

What is claimed is:

1. An image display device comprising:
a display element configured to modulate light to form an image;
a light transfer unit configured to transmit the image formed by the display element to eyes of an observer, the light transfer unit comprising a focusing member; and
a driver configured to drive the display element to change a position of the display element, the driver comprising:
a first actuator comprising a deformable wire;
a housing that fixes a first end and a second end of the deformable wire; and
an operating structure through which the deformable wire is routed, wherein the operating structure is configured move the display element in a first direction in conjunction with a length variation of the deformable wire, and the operating structure comprises an elastic structure configured to prevent tilt with respect to an axis in the first direction.

2. The image display device of claim 1, wherein the driver is further configured to move the display element in the first direction parallel to an optical axis of the display element, to change a distance between the display element and the focusing member.

3. The image display device of claim 1, wherein the operating structure further comprises:
a moving plate on which the display element is mounted; and
a fixed plate fixed to the housing, and
wherein the elastic structure is provided between the moving plate and the fixed plate to elastically support a movement of the moving plate with respect to the fixed plate.

4. The image display device of claim 3, wherein the elastic structure comprises a first elastic structure provided on a first side of the moving plate and a second elastic structure provided on a second side of the moving plate opposite to the first side, and
wherein the first elastic structure and the second elastic structure are arranged to have 180° rotational symmetry with respect to the axis passing through a center of the moving plate in the first direction.

5. The image display device of claim 4, wherein each of the first elastic structure and the second elastic structure comprises a 4-bar linkage structure.

6. The image display device of claim 4, wherein each of the first elastic structure and the second elastic structure comprises:
a middle plate;
two lower link bars that connects the middle plate to the fixed plate; and
two upper link bars that connects the middle plate to the moving plate.

7. The image display device of claim 6, wherein the deformable wire comprises:
a first deformable wire that connects the middle plate of the first elastic structure to one side of the housing; and
a second deformable wire that connects the middle plate of the second elastic structure to another side of the housing, and
wherein the first deformable wire and the second deformable wire have 180° rotational symmetry with respect to the axis passing through the center of the moving plate in the first direction.

8. The image display device of claim 6, wherein a width of first connecting portions of the two lower link bars adjacent to the middle plate and a width of second connecting portions of the two lower link bars adjacent to the fixed plate are smaller than widths of the other portions of the two lower link bars, and
wherein a width of third connecting portions of the two upper link bars adjacent to the middle plate and a width of fourth connecting portions of the two upper link bars adjacent to the moving plate are smaller than widths of the other portions of the two upper link bars.

9. The image display device of claim 8, wherein the operating structure has an integrated structure machined from a single metal sheet.

10. The image display device of claim 4, wherein two routing through holes are provided at the center of the moving plate, and
wherein the deformable wire extends from a first side of the housing, sequentially passes through the two routing through holes, and is connected to a second side of the housing.

11. The image display device of claim 10, wherein a first fixing through hole is provided on the first side of the housing and a second fixing through hole is provided on the second side of the housing, and
wherein the deformable wire is fixed through the first fixing through hole and the second fixing through hole.

12. The image display device of claim 11, wherein the housing comprises a first post facing the first fixing through hole and a second post facing the second fixing through hole, and
wherein the deformable wire passes through the first through hole and the second through hole after surrounding the first post and the second post, respectively, at least one time.

13. The image display device of claim 3, further comprising a first buckling structure supporting a position changed state of the moving plate and provided on a first side of the moving plate; and
a second buckling structure supporting the position changed state of the moving plate and provided on a second side of the moving plate different from the first side.

14. The image display device of claim 13, wherein the housing comprises a first sidewall and a second sidewall on which the first end and the second end of the deformable wire are respectively fixed and a bottom surface on which the fixed plate is fixed,
wherein the first buckling structure has a strip-like shape having one end elastically coupled to the first side of the moving plate and another end elastically coupled to the first sidewall of the housing, and
wherein the second buckling structure has the strip-like shape having one end elastically coupled to the second side of the moving plate and another end elastically coupled to the second sidewall of the housing.

15. The image display device of claim 14, wherein an elastic coupling state of the first buckling structure and the second buckling structure with respect to the first sidewall, the second sidewall, the first side of the moving plate, and the second side of the moving plate is set such that the moving plate has a stable state at two predetermined distance positions with respect to the fixed plate.

16. The image display device of claim 14, further comprising:
a second actuator provided between the moving plate and the bottom surface of the housing and configured to provide a driving force to the moving plate, the second actuator comprising:
a first elastic bridge having a first curved surface convexly curved toward the moving plate;
a second elastic bridge having a second curved surface convexly curved toward the bottom surface; and
a second deformable wire fixed to both ends of the first elastic bridge and to both ends of the second elastic bridge.

17. The image display device of claim 16, wherein the first elastic bridge has an elastic restoring force in a direction in which a first radius of curvature of the first elastic bridge increases, and
wherein a center portion of the first elastic bridge is fixed to the moving plate.

18. The image display device of claim 17, wherein the second elastic bridge has an elastic restoring force in a second direction in which a second radius of curvature of the second elastic bridge increases, and
wherein a center portion of the second elastic bridge is fixed to the bottom surface of the housing.

19. The image display device of claim 16, wherein the second actuator is further configured to provide the driving force such that the moving plate is moved away from the fixed plate, and
wherein the first actuator is configured to provide an opposite driving force such that the moving plate is moved toward the fixed plate.

20. The image display device of claim 19, wherein, when a length of the second deformable wire is shortened, the moving plate is moved away from the fixed plate, and
wherein, when a length of the deformable wire of the first actuator is shortened, the moving plate is moved toward the fixed plate.

21. The image display device of claim 16, wherein power is applied to the first actuator and the second actuator only while a length of the deformable wire of the first actuator and a length of the second deformable wire are being changed.

22. The image display device of claim 1, wherein the deformable wire comprises a material that is deformable by heat.

23. The image display device of claim 22, wherein the deformable wire comprises a shape memory alloy or an electroactive polymer.

24. The image display device of claim 1, wherein the light transfer unit is further configured to the formed image to the eyes of the observer as an enlarged image on a virtual image plane at a predetermined position.

25. The image display device of claim 1, further comprising a processor configured to generate a driving signal to control the driver based on image information,
wherein the image information comprises depth information in conjunction with a position of a virtual image plane for each image of a plurality of frames included in the image information, and
wherein the processor is further configured to generate the driving signal according to the depth information.

26. The image display device of claim 1, wherein the light transfer unit is further configured to combine first light comprising the formed image and second light comprising a second image of a real environment in front of the observer, and transmit the combined first light and second light to the eyes of the observer.

27. The image display device of claim 26, wherein the light transfer unit further comprises a beam splitter provided obliquely with respect to a first traveling path of the first light and with respect to a second traveling path of the second light.

28. The image display device of claim 1, wherein the display element comprises a first display element and a second display element,
wherein the driver comprises a first driver and a second driver for respectively driving the first display element and the second display element, to change respective positions of the first display element and the second display element, and
wherein the light transfer unit further comprises a first light transfer unit and a second light transfer unit that transmit images formed by the first display element and the second display element to a left eye and a right eye of the observer, respectively.

29. The image display device of claim 28, further comprising a processor configured to control the display element based on image information,
wherein the image information comprises information about a pair of a left-eye image and a right-eye image to be recognized as a single frame 3D image, and
wherein the processor is further configured to control the first display element and the second display element, such that the left-eye image is formed by the first display element and the right-eye image is formed by the second display element.

* * * * *